(12) United States Patent
Shamoto

(10) Patent No.: US 9,731,360 B2
(45) Date of Patent: Aug. 15, 2017

(54) END MILLING APPARATUS, CAM APPARATUS, AND NC PROGRAM

(71) Applicant: National University Corporation Nagoya University, Nagoya-shi (JP)

(72) Inventor: Eiji Shamoto, Nagoya (JP)

(73) Assignee: National University Corporation Nagoya University, Nagoya-shi, Aichi (JP)

( * ) Notice: Subject to any disclaimer, the term of this patent is extended or adjusted under 35 U.S.C. 154(b) by 41 days.

(21) Appl. No.: 14/901,290

(22) PCT Filed: Jun. 30, 2014

(86) PCT No.: PCT/JP2014/003478
§ 371 (c)(1),
(2) Date: Dec. 28, 2015

(87) PCT Pub. No.: WO2015/001789
PCT Pub. Date: Jan. 8, 2015

(65) Prior Publication Data
US 2016/0368068 A1 Dec. 22, 2016

(30) Foreign Application Priority Data

Jul. 1, 2013 (JP) .................................. 2013-138279

(51) Int. Cl.
*B23C 9/00* (2006.01)
*B23C 5/28* (2006.01)
(Continued)

(52) U.S. Cl.
CPC .................. *B23C 5/28* (2013.01); *B23C 3/30* (2013.01); *B23C 9/00* (2013.01); *B23Q 11/0032* (2013.01);
(Continued)

(58) Field of Classification Search
CPC ......... B23C 2210/56; B23C 9/00; B23C 5/28; B23Q 2220/008; Y10T 409/304032
See application file for complete search history.

(56) References Cited

U.S. PATENT DOCUMENTS

| | | | | |
|---|---|---|---|---|
| 3,821,921 A | * | 7/1974 | Rosenberg | ........... B23Q 15/225 408/10 |
| 5,152,644 A | * | 10/1992 | Mathews | .................. B23C 1/20 408/241 S |
| 6,491,483 B1 | * | 12/2002 | Ford | .......................... B27C 1/10 407/54 |

FOREIGN PATENT DOCUMENTS

| | | | | |
|---|---|---|---|---|
| DE | 3042304 A1 | * | 6/1982 | ............... A61C 3/00 |
| JP | 52008580 A | * | 1/1977 | ............... B23Q 3/10 |

(Continued)

OTHER PUBLICATIONS

ProQuest machine translation of JP 08-257823, printed Mar. 2017.*
(Continued)

*Primary Examiner* — Daniel Howell
(74) *Attorney, Agent, or Firm* — McGinn IP Law Group, PLLC

(57) ABSTRACT

An end milling apparatus has an end mill and a support member. The end mill has a cutting portion and a non-cutting portion. The support member supports the non-cutting portion in at least one direction toward the periphery of the end mill. The width of the support member as measured in the direction orthogonal to the direction of the center axis of the end mill and to the direction in which the support member is located as viewed from the end mill is smaller than the outer diameter of the end mill.

19 Claims, 18 Drawing Sheets

(51) Int. Cl.
*B23Q 11/00* (2006.01)
*B23Q 11/10* (2006.01)
*G05B 19/23* (2006.01)
*B23C 3/30* (2006.01)

(52) U.S. Cl.
CPC .............. *B23Q 11/10* (2013.01); *G05B 19/23* (2013.01); *B23C 2210/56* (2013.01); *B23C 2250/12* (2013.01); *B23Q 2220/008* (2013.01); *G05B 2219/45145* (2013.01); *Y10T 409/304032* (2015.01)

(56) References Cited

FOREIGN PATENT DOCUMENTS

| | | | |
|---|---|---|---|
| JP | H08-257823 A | | 10/1996 |
| JP | 2000-000714 A | | 1/2000 |
| JP | 2001328021 A | * | 11/2001 |
| JP | 2010264524 A | * | 11/2010 |
| JP | 2015123536 A | * | 7/2015 |

OTHER PUBLICATIONS

International Search Report (ISR) (PCT Form PCT/ISA/210), in PCT/JP2014/003478, dated Sep. 30, 2014.
Chinese Office Action dated Nov. 3, 2016 with an English translation thereof.

* cited by examiner

○ ≦ 1 μm,  1 μm < △ ≦ 2 μm,  2 μm < × ≦ 4 μm,  * > 4 μm

Spindle speed rpm

END MILLING APPARATUS, CAM APPARATUS, AND NC PROGRAM

TECHNICAL FIELD

The technical field of the present specification relates to an end milling apparatus, a CAM apparatus, and an NC program. More specifically, the technical field of the present specification relates to an end milling apparatus which suppresses vibrations during machining, as well as to a CAM apparatus and an NC program.

BACKGROUND ART

Cutting is frequently used in a process of manufacturing an industrial product. For example, cutting may be used for direct machining of a product, machining of a die, or the like. When such cutting is performed, chatter vibrations may be produced on a tool. Such a chatter vibration causes deterioration of the shape of a finished surface and/or damage to a tool.

Chatter vibrations are classified into two types; i.e., forced vibration and self-excited vibration. Forced vibration is produced when some kind of forced-vibration-causing vibration is amplified due to the vibration characteristic of a machine. For example, intermittent cutting force produced during end milling causes such a forced vibration. However, in some cases, forced vibration is not contained in the chatter vibrations. Self-excited vibration is a vibration which grows and increases in level due to presence of a closed loop which feeds back the vibration in a cutting process.

Self-excited vibration is classified into two main types; i.e., regenerative-type self-excited vibration and mode-coupling-type self-excited vibration. Regenerative-type self-excited vibration is produced, for example, when a vibration produced as a result of cutting performed at the point which precedes the present time by a time corresponding to one revolution or one tooth period remains in the form of an undulation of a machined surface, and the uncut chip thickness fluctuates due to the remaining shape and the present vibration. Mode-coupling-type self-excited vibration is produced, for example, as a result of coupling of vibration modes in two directions whose resonant frequencies are close to each other. The following Table 1 shows the above-mentioned types of chatter vibrations.

TABLE 1

(a) Forced vibration
(b) Self-excited vibration
  (b-1) Regenerative-type self-excited vibration
  (b-2) Mode-coupling-type self-excited vibration Therefore, techniques for suppressing chatter vibrations have been developed. For example, Patent Document 1 discloses an unequally divided end mill which has an odd number of cutting teeth and in which pitch angles different from one another are provided.

PRIOR ART DOCUMENT

Patent Document

Patent Document 1: Japanese Patent Application Laid-Open (kokai) No. 2000-714

SUMMARY OF THE INVENTION

Problems to be Solved by the Invention

In the disclosed end mill, the phase of a "regeneration effect" which remains on a machined surface and changes the present uncut chip thickness is not maintained constant. Therefore, regenerative-type self-excited vibration can be suppressed. However, the end mill disclosed in Patent Document 1 encounters difficulty in suppressing mode-coupling-type self-excited vibration.

In recent years, there has arisen an increasing need for forming a groove whose depth is greater than the width thereof during formation of a die. Formation of such a deep groove necessitates use of an end mill which is large in the ratio of its overhang length to its outer diameter; namely, a slender end mill. In the case where such a slender end mill is used, self-excited vibration becomes more likely to be produced as compared with the case where a conventional end mill is used.

The technique described in the present specification was developed to solve the problems of the above-described conventional technique. Its object is to provide an end milling apparatus which suppresses at least mode-coupling-type self-excited vibration, as well as a CAM apparatus and an NC program therefor.

Means for Solving the Problems

An end milling apparatus according to a first aspect comprises an end mill having a cutting portion and a non-cutting portion; and at least one support member which supports the non-cutting portion of the end mill in at least one direction toward a periphery of the end mill. The width of the support member as measured in a direction orthogonal to a direction of a center axis of the end mill and to a direction in which the support member is located as viewed from the end mill is smaller than the outer diameter of the end mill.

This end milling apparatus has a support member which supports the non-cutting portion of the end mill. This support suppresses generation of mode-coupling-type self-excited vibration. Therefore, the end mill is hardly damaged. Also, machining accuracy hardly lowers due to amplification of vibration. Also, the support member is less likely to come into contact with a workpiece. Therefore, this end milling apparatus is suitable for formation of a groove whose depth is greater than the width thereof.

An end milling apparatus according to a second aspect has a cutting fluid supply section which supplies cutting fluid to the end mill. The support member supports the non-cutting portion of the end mill via the cutting fluid. Therefore, the support member can support the non-cutting portion of the end mill without coming into contact with the non-cutting portion of the end mill. At that time, the support member supports the end mill by the dynamic pressure of the cutting fluid.

An end milling apparatus according to a third aspect has a lubrication oil supply section which supplies lubrication oil to the end mill. The support member has a flow passage through which the lubrication oil supplied from the lubrication oil supply section flows, and a lubrication oil supply opening for supplying the lubrication oil to the non-cutting portion of the end mill.

In an end milling apparatus according to a fourth aspect, the support member supports the non-cutting portion of the end mill via the lubrication oil. Therefore, the support member can support the non-cutting portion of the end mill without coming into contact with the non-cutting portion of the end mill. At that time, the support member supports the end mill by the dynamic pressure of the lubrication oil. Notably, the lubrication oil may also serve as the cutting fluid.

In an end milling apparatus according to a fifth aspect, the support member supports the end mill in a state in which the support member is in contact with the non-cutting portion.

An end milling apparatus according to a sixth aspect has two or more support members. The support members support the non-cutting portion of the end mill in different directions. Since the two or more support members support the end mill, mode-coupling-type self-excited vibration can be suppressed to a greater degree. For example, in the case where one support member is provided in front of the end mill and another support member is provided behind the end mill, as viewed in the feed direction, mode-coupling-type self-excited vibration is suppressed satisfactorily. Also, in the case where a support member is provided in each of the X-axis direction and the Y-axis direction, not only mode-coupling-type self-excited vibration but also regenerative-type self-excited vibration and forced vibration can be suppressed satisfactorily.

In an end milling apparatus according to a seventh aspect, the support member has at least one support surface which faces the non-cutting portion of the end mill. The support surface is a portion of a cylindrical inner surface. Therefore, the end mill can be supported more properly.

In an end milling apparatus according to an eighth aspect, the support member has two or more support surfaces. Therefore, the end mill can be supported more properly.

In an end milling apparatus according to a ninth aspect, the support member is disposed at at least one of a location in front of the end mill and a location behind the end mill with respect to a feed direction in which the end mill is advanced relative to a workpiece. Therefore, the support member is less likely to interfere with a workpiece.

In an end milling apparatus according to a tenth aspect, the cutting portion of the end mill is formed to have a variable lead or a variable pitch. Not only mode-coupling-type self-excited vibration but also regenerative-type self-excited vibration can be suppressed sufficiently. Since self-excited vibration in which the vibration grows and increases in level can be suppressed, both improvement of machining accuracy and improvement of durability of a tool can be expected.

An end milling apparatus according to an eleventh aspect has a bearing which supports the stationary support member on a holder which grasps the end mill and couples the end mill with a rotary spindle. Therefore, an operation of exchanging the end mill with other tools can be performed easily.

A CAM apparatus according to a twelfth aspect is adapted to support the above-described end milling apparatus. The CAM apparatus supports process design or work design through use of the shape of the end mill and the shape of the support member.

An NC program according to a thirteenth aspect is adapted to operate the above-described end milling apparatus. The NC program operates the end milling apparatus on the basis of shape information and positional information of the support member and shape information and positional information of a workpiece.

An NC program according to a fourteenth aspect is adapted to operate the above-described end milling apparatus. The NC program contains an auxiliary operation command which instructs an auxiliary operation for preventing the support member from interfering with a workpiece.

An NC program according to a fifteenth aspect is adapted to operate the above-described end milling apparatus so as to machine a workpiece by up cut.

Effect of the Invention

In the present specification, there are provided an end milling apparatus which suppresses at least mode-coupling-type self-excited vibration, as well as a CAM apparatus and an NC program.

EMBODIMENTS

With reference to the drawings, specific embodiments will be described by taking, as examples, an end milling apparatus and a machining system.

(First Embodiment)

1. End Milling Apparatus

Figure 1:
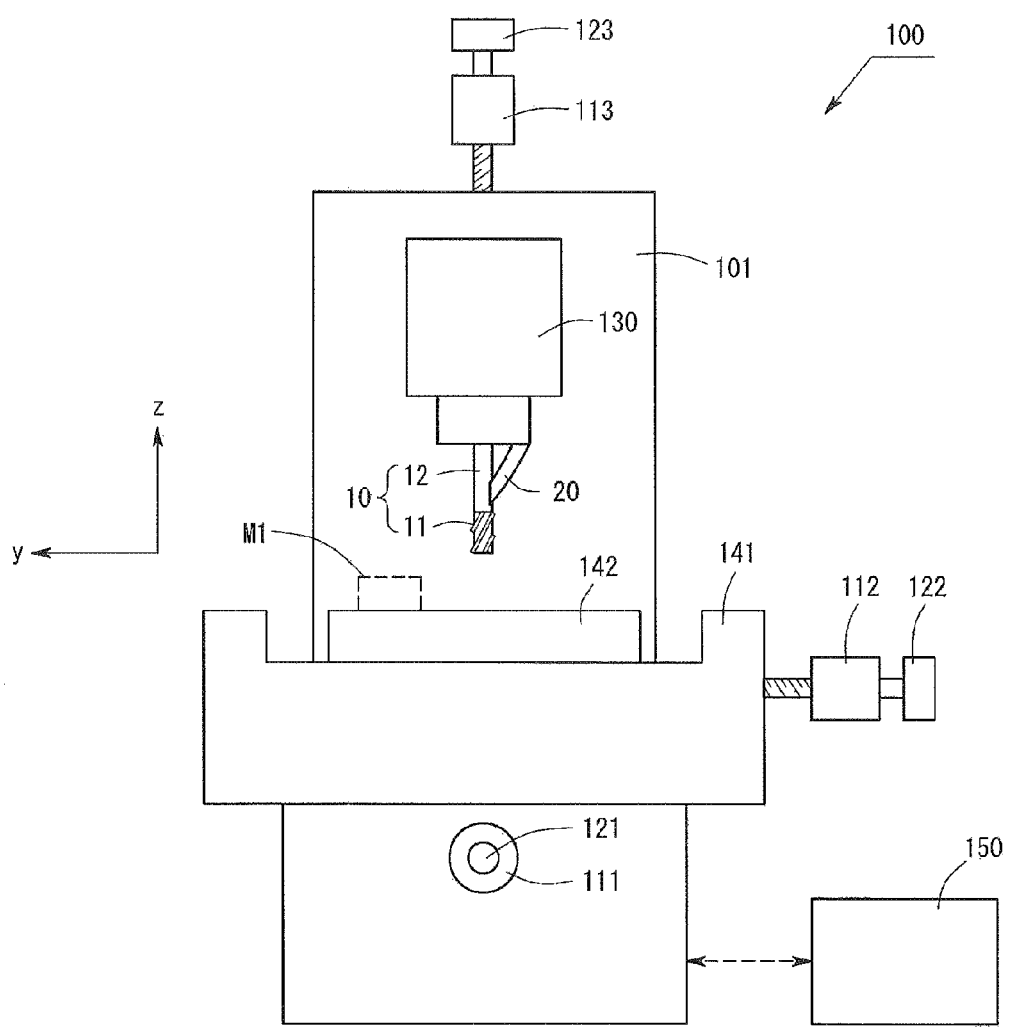
FIG. 1 is a schematic view showing the structure of an end milling apparatus according to a first embodiment.

FIG. 1 shows an end milling apparatus 100 of the present embodiment. The end milling apparatus 100 includes an end mill 10, a support member 20, a machining unit 130, a machine body 101, an X-axis motor 111, a Y-axis motor 112, a Z-axis motor 113, an X-axis sensor 121, a Y-axis sensor 122, a Z-axis sensor 123, an X-axis feed table 141, a Y-axis feed table 142, and a control section 150.

The end mill 10 is a tool for machining a workpiece which is an object actually machined. The end mill 10 has a cutting portion 11 for machining a workpiece, and a non-cutting portion 12 which is formed integrally with the cutting portion 11 and on which no cutting edge is formed. The cutting portion 11 is located on the distal end side of the non-cutting portion 12.

The end milling apparatus 100 of the present embodiment is suitable for machining of a narrow groove. Therefore, the overhang length L1 of the end mill 10 is large as compared with its diameter D1. The ratio of the overhang length L1 to the diameter D1 is 10 or greater. From the viewpoint of machining time, the ratio of the overhang length L1 to the diameter D1 is 40 or less. Namely, the ratio of the overhang length L1 to the diameter D1 falls within the range of 10 to 40, preferably, 10 to 35, more preferably, 15 to 30. As described above, in the end mill 10, the overhang length L1 is very large as compared with the diameter D1. Since a support member 20 which will be described later is provided, the end mill 10 which is thin and long can machine the workpiece efficiently and accurately.

The support member 20 is a member for supporting the end mill 10. More specifically, the support member 20 comes into contact with the non-cutting portion 12 of the end mill 10 to thereby support the end mill 10. The support member 20 supports the non-cutting portion 12 at a position close to the cutting portion 11. Although the end mill 10 rotates together with a spindle, the support member 20 does not rotate together with the spindle. Namely, the support member 20 is permanently fixed to a non-rotating portion of the machining unit 130. Since the supported portion is the non-cutting portion 12, the support member 20 is not machined by the end mill 10. However, when the workpiece is machined, the support member 20 is in contact with the non-cutting portion 12 of the rotating end mill 10. Therefore, as a result of use of the end milling apparatus 100, the support member 20 may wear. In the present embodiment, since the support member 20 is provided, mode-coupling-type self-excited vibration can be suppressed as will be described later.

The machining unit 130 is an end milling unit for supporting the spindle which holds the end mill 10. The machining unit 130 can be moved in the Z-axis direction by the Z-axis motor 113. The machining unit 130 will be described in detail later.

The X-axis feed table 141 is a table on which a workpiece M1 is mounted. The X-axis feed table 141 can be moved in the X-axis direction by the X-axis motor 111. The Y-axis feed table 142 can be moved in the Y-axis direction by the Y-axis motor 112. As a result, the X-axis feed table 141 can be moved in the X-axis direction and the Y-axis direction.

The X-axis motor 111 moves the X-axis feed table 141 in the X-axis direction. The Y-axis motor 112 moves the Y-axis feed table 142 in the Y-axis direction. The Z-axis motor 113 moves the machining unit 130 in the Z-axis direction. The position of the end mill 10 relative to the workpiece M1 can be adjusted by these motors.

Figure 2:
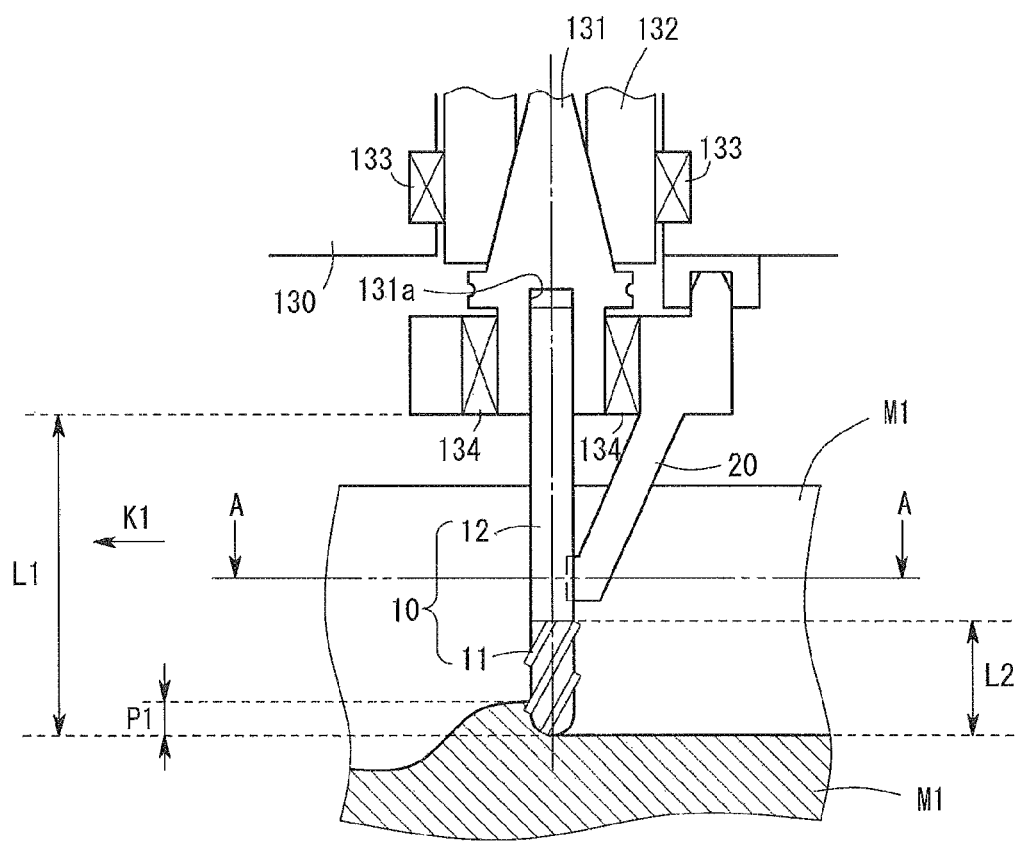
FIG. 2 is a sectional view showing the structure of a portion of the end milling apparatus according to the first embodiment, which portion is in the vicinity of an end mill.

FIG. 2 is a sectional view showing the internal structure of the machining unit 130. The machining unit 130 includes the end mill 10, the support member 20, a tool holder 131, the rotary spindle 132, a spindle bearing 133, and a bearing 134.

The tool holder 131 is a tool holding portion which holds the end mill 10 and couples the end mill 10 with the rotary spindle 132. The tool holder 131 has a concave portion 131a, and the end mill 10 is held in a state in which it is fitted to the concave portion 131a. The holding mechanism of the tool holder 131 for holding the end mill 10 is the same as a known technique. Also, the tool holder 131 is coupled with the rotary spindle 132, and is rotated and driven by the rotary spindle 132. Namely, the tool holder 131 rotates together with the end mill 10.

The spindle bearing 133 is one of bearings which support the rotary spindle 132. Therefore, the rotary members; i.e., the rotary spindle 132, the tool holder 131, and the end mill 10, which rotate as a single body, are supported by the spindle bearing 133, etc. The bearing 134 is a member for supporting the support member 20 on the tool holder 131. The inner race of the bearing 134 is fixed to the tool holder 131, and the outer race of the bearing 134 is fixed to the support member 20. Therefore, at the time of tool exchange, the end mill 10, the support member 20, and the tool holder 131 are exchanged together.

2. Support Member

Figure 3:
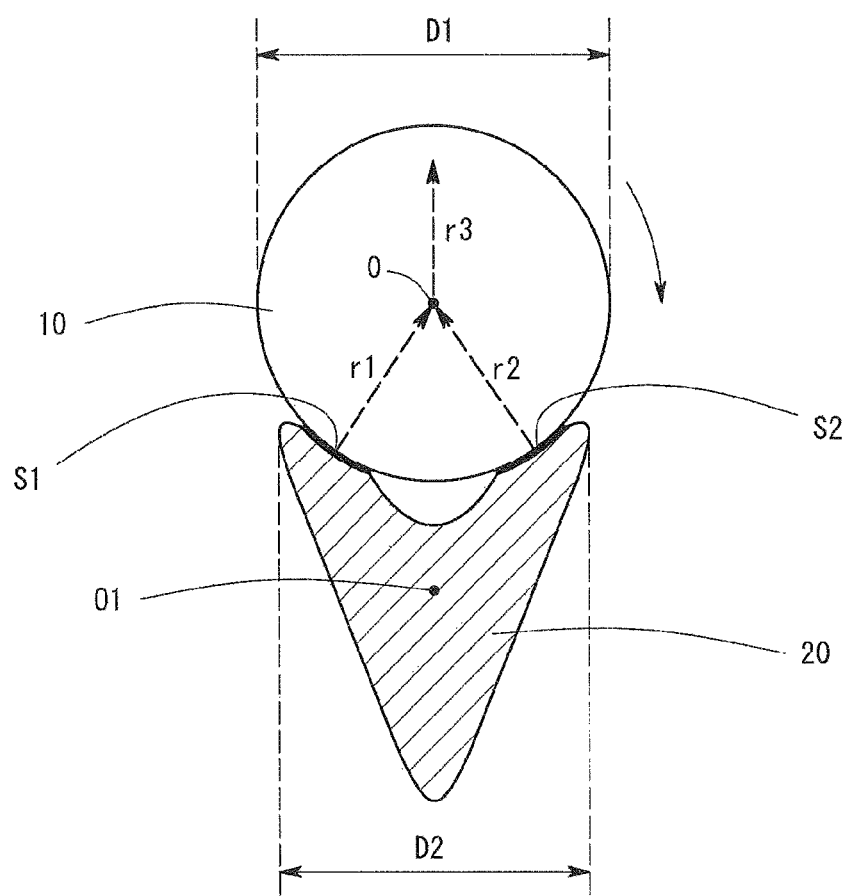
FIG. 3 is a sectional view showing a cross section taken along line A-A of FIG. 2.

Here, the location of contact between the support member 20 and the end mill 10 will be described. FIG. 3 is a sectional view showing a cross section taken along line A-A of FIG. 2. The A-A cross section is a plane which contains the end mill 10 and at least a portion of the support member 20 and which is orthogonal to the rotation center axis of the end mill. As shown in FIG. 3, the support member 20 supports the end mill 10 at two locations; i.e., by two support portions S1 and S2. The support portions S1 and S2 have support surfaces which face the non-cutting portion 12 of the end mill 10. The support surfaces have the same shape as a portion of the cylindrical inner surface. The diameter of the cylindrical inner surface is equal to or slightly larger than the outer diameter of the non-cutting portion 12 of the end mill 10. During machining, the support portion S1 of the support member 20 presses the end mill 10 in the direction of an arrow r1. Similarly, the support portion S2 of the support member 20 presses the end mill 10 in the direction of an arrow r2.

In FIG. 3, the arrows r1 and r2 are directed toward the center O of the end mill 10. However, the arrows r1 and r2 are not required to be directed toward the center O of the end mill 10. An arrow r3 shows a support direction in which the support member 20 supports the end mill 10. The support direction (r3) refers to a direction from the center (O1) of the support member 20 toward the center (O) of the end mill 10. The center O1 of the support member 20 is the position of the centroid of the support member 20 in the A-A cross section. In the present embodiment, the support direction r3 coincides with a feed direction K1 in which the end mill 10 advances relative to the workpiece. In the case where the support direction r3 coincides with the feed direction K1 as described above, the workpiece M1 is easily machined without occurrence of interference between the support member 20 and the workpiece M1.

3. Control System

Figure 4:
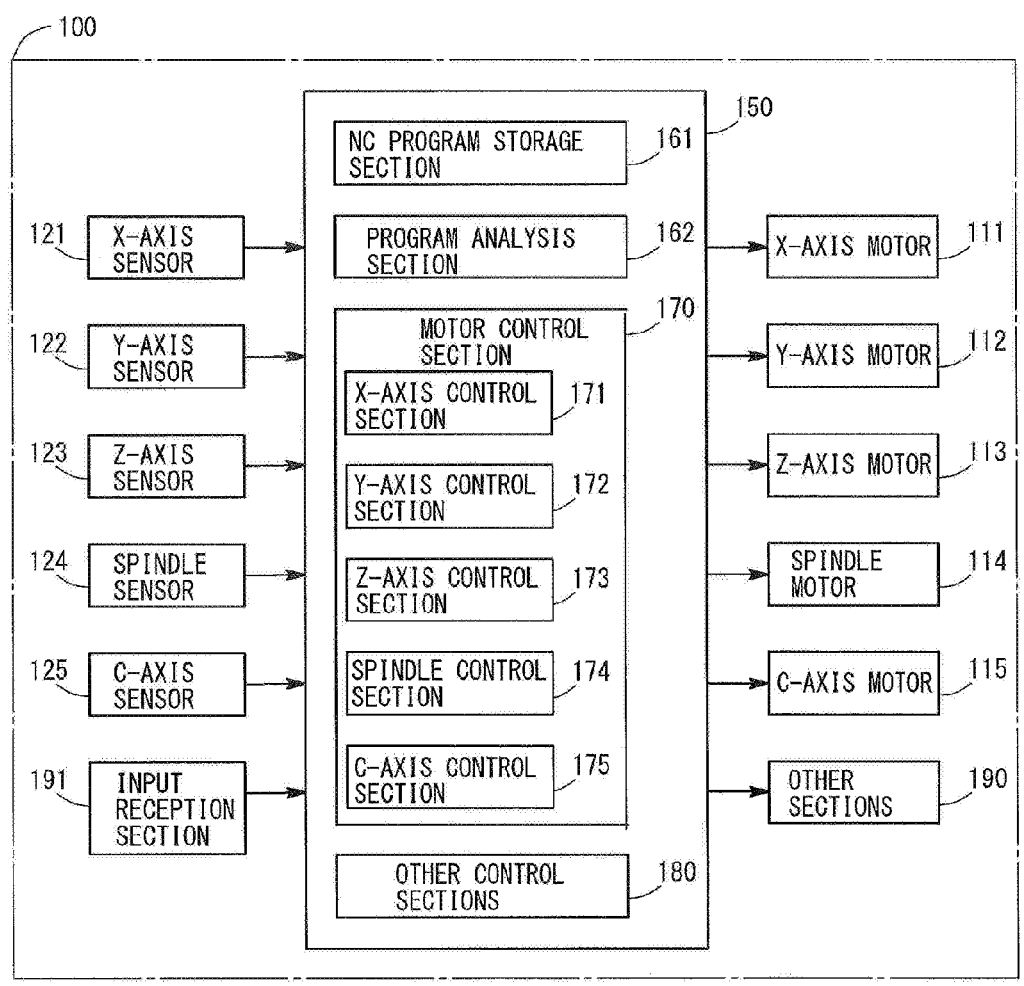
FIG. 4 is a block diagram showing the control system of the end milling apparatus according to the first embodiment.

FIG. 4 shows the control system of the present embodiment. As shown in FIG. 4, the control section 150 includes an NC program storage section 161, a program analysis section 162, a motor control section 170, and other control sections 180.

The NC program storage section 161 stores an NC program. The program analysis section 162 analyzes the NC program stored in the NC program storage section 161 for execution of the program. The motor control section 170 controls the motors.

The motor control section 170 includes an X-axis control section 171, a Y-axis control section 172, a Z-axis control section 173, a spindle control section 174, and a C-axis control section 175. The X-axis control section 171 controls the position of the workpiece M1 in the X-axis direction. The position refers to the relative position of the end mill 10 with respect to the workpiece M1. The Y-axis control section 172 controls the position of the workpiece M1 in the Y-axis direction. The Z-axis control section 173 controls the position of the workpiece M1 in the Z-axis direction. The spindle control section 174 controls the rotation of the spindle of the end mill 10. The C-axis control section 175 controls the rotational position of the workpiece M1 such that the support member 20 does not interfere with the workpiece M1. This C-axis control section 175 will be described in the chapter for a modification of a fifth embodiment. Namely, the C-axis control section 175 is not an essential component of the present embodiment.

A spindle sensor 124 detects rotation of the spindle. A C-axis sensor 125 detects the rotational position of the C axis. A spindle motor 114 rotates the spindle. A C-axis motor 115 can be used to change the position of the workpiece M1 relative to the support member. An input reception section 191 receives instructions input by an operator. Other portions 190 are the components of the end milling apparatus 100 other than the above-described components.

4. Machining Method

Figure 5:
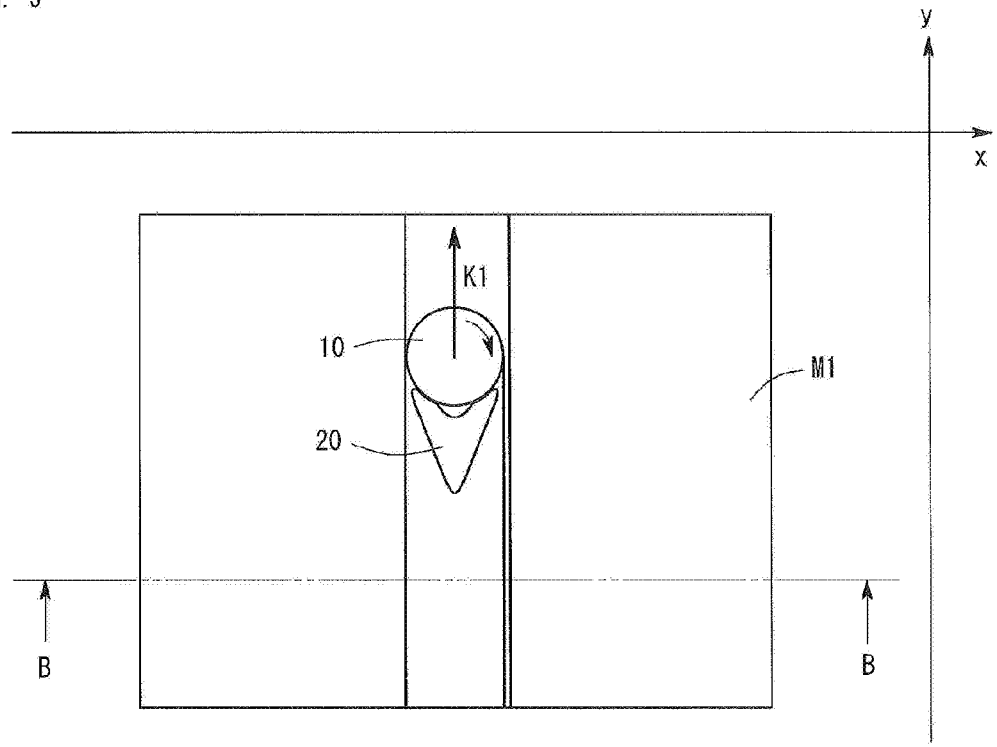
FIG. 5 is a view used for explaining a machining method of the end milling apparatus according to the first embodiment.

A machining method of the end milling apparatus 100 of the present embodiment will be described. As shown in FIG. 5, the feed direction of the end mill 10 (an arrow K1 in FIG. 5); i.e., the direction in which the end mill 10 moves relative to the workpiece M1, will be referred to as the Y-axis positive direction. In such a case, the support member 20 is disposed in the Y-axis negative direction as viewed from the end mill 10. Notably, FIG. 6 is a view showing a cross section taken along line B-B of FIG. 5.

As shown in FIG. 3, the width D2 of the support member 20 as measured in a direction orthogonal to the feed direction K1 is smaller than the diameter D1 of the end mill 10 over the entire overhang length L1 of the end mill 10. Therefore, even in the case where a deep groove is formed, the support member 20 is unlikely to interfere with the workpiece M1. However, this relation is not required to be satisfied in the vicinity of a root portion (tail portion) of the end mill 10. As described above, the width D2 of the support member 20 as measured in the direction which is orthogonal to both the direction of the center axis of the end mill 10 and the direction in which the support member 20 is located as viewed from the end mill 10 is smaller than the diameter D1 of the end mill 10. Here, the direction in which the support member 20 is located as viewed from the end mill 10 refers to the direction from the center (O) of the end mill 10 toward the center (O1) of the support member 20.

Figure 6:
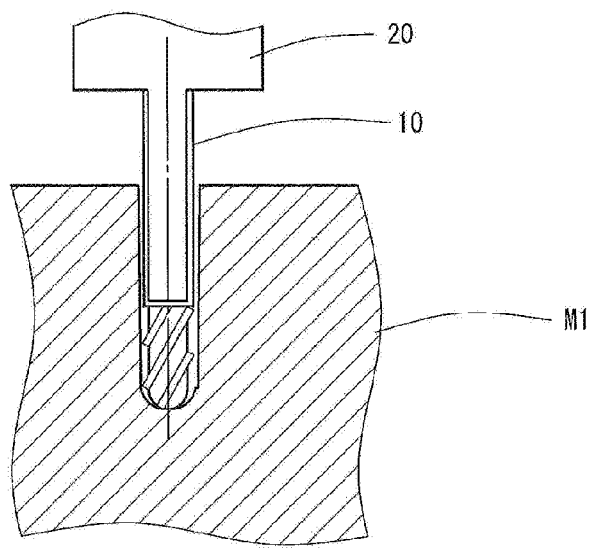
FIG. 6 is a sectional view showing a cross section taken along line B-B of FIG. 5.

Namely, the support member 20 has a width smaller than the dimeter of the non-cutting portion 12 at which the end mill 10 is supported (see FIG. 6). As described above, during a machining period during which the end mill 10 machines the workpiece M1, the support member 20 is disposed behind the end mill 10 with respect the feed direction K1 in which the end mill 10 is advanced relative to the workpiece M1. Therefore, the support member 20 hardly comes into contact with the workpiece M1. In the period in which the end mill 10 machines the workpiece M1, the attitude of the workpiece M1 (the rotational position of the workpiece M1 including the C axis) must be set such that the support member 20 is always located behind the end mill 10 with respect to the feed direction K1 of the end mill 10. Also, even during periods during which the end mill 10 does not machine the workpiece M1, the support member 20 may be similarly disposed at a position where the support member 20 does not interfere with the workpiece M1.

Notably, as shown in FIG. 2, in the case where the depth of a groove varies and the inclination of a bottom portion of the groove (the change rate of the depth of the groove) is large, the bottom surface of the groove and the support member 20 may interfere with each other. Such interference can be avoided by leaning the end mill 10 forward with respect to the workpiece M1. Specifically, the rotational position of the B axis about the Y axis is adjusted.

5. Suppression of Mode-coupling-type Self-excited Vibration

Mode-coupling-type self-excited vibration is generated and amplified as a result of coupling of vibration in the X-axis direction and vibration in the Y-axis direction. Therefore, such mode-coupling-type self-excited vibration can be suppressed by suppressing at least one of the vibration in the X-axis direction and the vibration in the Y-axis direction.

As described above, in the period in which the end mill 10 machines the workpiece M1, the support member 20 supports the non-cutting portion 12 of the end mill 10. Therefore, the vibration in the Y-axis direction is suppressed. Mode-coupling-type self-excited vibration is a vibration whose level may increase exponentially because the vibration in the X-axis direction and the vibration in the Y-axis direction form a closed loop while coupling with each other. Therefore, the level of mode-coupling-type self-excited vibration can be prevented from increasing exponentially by suppressing one of the vibrations (the vibration in the Y-axis direction in the present embodiment). In the present embodiment, the support member 20 suppresses the vibration in the Y-axis direction. As a result, mode-coupling-type self-excited vibration can be suppressed.

In the present embodiment, the Y-axis direction coincides with the feed direction. The vibration in the X-axis direction influences the accuracy of the surface of a finished surface of the workpiece M1. Therefore, suppressing the vibration in the Y-axis direction is seemingly not important from the viewpoint of improving the accuracy of the finished surface. However, by suppressing the vibration in the Y-axis direction, the loop of growth of the mode-coupling-type vibration can be broken. Namely, the accuracy of the finished surface is improved.

Also, in the present embodiment, the support direction (r3) coincides with the X-axis direction. However, when the vibration in the X-axis direction is generated, the support member 20 presses the end mill 10 in the direction of the arrow r1 or r2. The X-axis component of the pressing force suppresses the vibration of the end mill 10 in the X-axis direction to some degree. As a result, the regenerative-type self-excited vibration and forced vibration in the X-axis direction are suppressed to some degree.

6. Effects of the Present Embodiment

In the present embodiment, the support member 20 which supports the non-cutting portion 12 of the end mill 10 is provided on the end milling apparatus 100. Therefore, (b-2) mode-coupling-type self-excited vibration can be suppressed. Of the self-excited vibrations shown in Table 1, at least one vibration can be suppressed. Therefore, the overhang length L1 of the end mill 10 (see FIG. 2) and the length L2 of the cutting portion 11 of the end mill 10 can be increased. Namely, as compared with a conventional end milling apparatus, a groove whose depth is large as compared with the width of the groove can be formed. For example, when a die which requires draft is machined, such a deep groove can be machined properly.

Also, since vibrations can be suppressed to a greater degree as compared with a conventional end milling machine, a higher value can be set as machining efficiency as compared with the conventional one. Therefore, the machining cycle time of the end milling apparatus 100 is shorter than that of the conventional one.

7. Modifications 7-1. Number of Contact Portions of the Support Member

Figure 7:
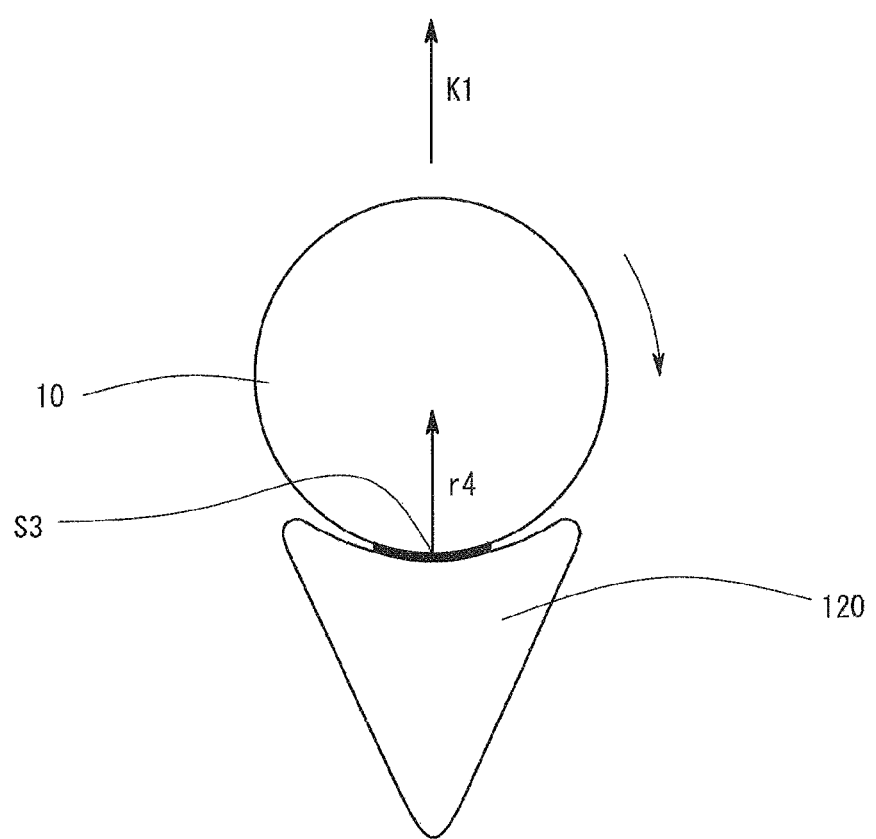
FIG. 7 is a sectional view showing a support member according to a first modification of the first embodiment.

In the present embodiment, the end mill 10 is supported by the two support portions S1 and S2. However, as shown in FIG. 7, there may be provided a support member 120 which supports the end mill 10 by a single support portion S3. In FIG. 7, the support portion S3 is located immediately behind the end mill 10 in the feed direction K1. Of course, three or more support members may be provided.

7-2. Shape of the Contact Portion(s) of the Support Member

The support portion is not required to come into contact with the end mill 10 at a single point. The support portion may have the shape of a cylindrical inner surface corresponding to the shape of a circular columnar outer surface of the non-cutting portion 12 of the end mill 10. Alternatively, the support portion may have the shape of an arcuate surface which is at least a portion of the cylindrical inner surface.

7-3. Direction in which the Support Member Supports the End Mill

Figure 8:
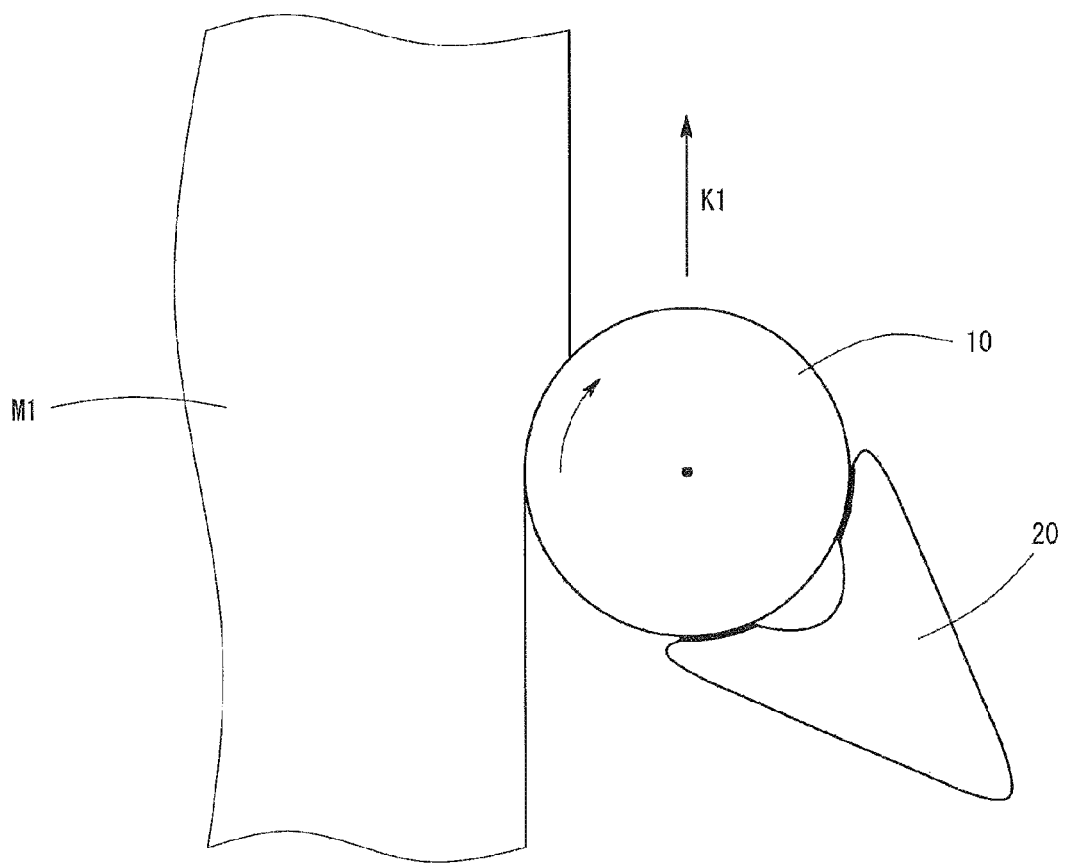
FIG. 8 is a sectional view showing a support member according to a second modification of the first embodiment.

Mode-coupling-type self-excited vibration is a vibration whose level increases as a result of coupling of vibration in the X-axis direction and vibration in the Y-axis direction. In the present embodiment, the support member 20 supports the non-cutting portion 12 of the end mill 10 in the Y-axis direction to thereby suppress mode-coupling-type self-excited vibration. However, mode-coupling-type self-excited vibration can be suppressed even when the outer periphery of the end mill 10 is supported in an arbitrary direction in the XY plane. FIG. 8 shows a specific example of that case. Of course, the end mill 10 may be supported in two or more directions. However, in the case where the end mill 10 is supported in the Y-axis direction as in the present embodiment, control which avoids the interference between the support member 20 and the workpiece M1 can be performed easily.

7-4. Variable Lead or Variable Pitch

The end milling apparatus 100 of the present embodiment can suppress (b-2) mode-coupling-type self-excited vibration. In addition, more preferably, a variable lead or variable pitch end mill is used as the end mill 10 because (b-1) regenerative-type self-excited vibration can also be suppressed.

Of the chatter vibrations shown in Table 1, two types of vibrations; i.e., (b-1) regenerative-type self-excited vibration and (b-2) mode-coupling-type self-excited vibration, have the possibility that the amplitude of the vibration increases exponentially. Therefore, these self-excited vibrations can be suppressed by using a variable lead or variable pitch end mill in addition to the support member 20. Therefore, as a result of the combined use of the variable lead or variable pitch and the support member, the average life of the tool becomes very long. Also, since the amplitude of the vibration hardly increases exponentially, a stable cutting operation can be performed even when the overhang length L1 (see FIG. 2) of the end mill 10 and the length L2 of the cutting portion 11 of the end mill 10 are increased.

Also, for such a purpose, the control section 150 preferably has a chatter vibration frequency detection section, a cutting portion information input reception section, and a calculation section. The chatter vibration frequency detection section detects the chatter vibration frequency of the end mill 10. The cutting portion information input reception section receives the input of information of the cutting portion such as the shape and number of cutting edges of the end mill 10 and information of machining conditions such as a set axial infeed amount. Of course, in this case, an input section through which a user inputs the information of the cutting portion and the information of the machining conditions is provided on the end milling apparatus 100. On the basis of the above-described chatter vibration frequency, the above-described information of the cutting portion, and the above-described information of the machining conditions, the calculation section calculates a rotational speed of the spindle which can properly suppress self-excited vibrations.

7-5. Angle of the End Mill

In the present embodiment, the feed motion of the end mill 10 relative to the workpiece M1 is realized by combining the translational motions in the X-axis direction, the Y-axis direction, and the Z-axis direction (the axial direction of the spindle and the end mill). However, the rotational motion about the A axis which is the axis of rotation around the X axis and the rotational motion about the B axis which is the axis of rotation around the Y axis may be combined.

7-6. Feed Direction and Support Direction

In the present embodiment, the feed direction K1 of the end mill 10 coincides with the support direction r3 in which the support member 20 supports the end mill 10. However, these directions are not required to coincide with each other. This is because, in order to suppress mode-coupling-type self-excited vibration, it is sufficient to attenuate the vibration in an arbitrary direction in a plane including the X-axis direction and the Y-axis direction in which the rigidity of the end mill 10 is low. Therefore, it is sufficient that the support member 20 supports the non-cutting portion 12 of the end mill 10 in one or more arbitrary directions.

Notably, in the case where the depth of the groove of the workpiece M1 varies, in accordance with the variation of the depth, the feed direction K1 may incline from the Y-axis direction in the Z-axis direction. In such a case, of course, at least a difference corresponding to the component in the Z-axis direction is provided between the feed direction K1 and the support direction r3 defined in the plane including the X-axis direction and the Y-axis direction. However, since the rigidity of the end mill 10 in the Z-axis direction is high, the end mill 10 is not required to be supported. Also, as described in the chapter of the machining method, when the gradient of the change in the depth of the groove is not large as compared with the gradient of a direction in which the support member 20 extends as viewed from the end of the end mill 10, interference does not occur between the bottom surface of the groove and the support member 20. On the contrary, a CAD/CAM apparatus which will be described later may be configured to calculate a tool path while imposing a restriction on the gradient (the ratio of the component in the Z-axis direction) of the feed direction K1 such that the gradient does not exceeds a gradient at which interference occurs.

7-7. Relative Position of the End Mill with Respect to the Workpiece

In the present embodiment, the X-axis, Y-axis, and Z-axis coordinates of the end mill 10; i.e., the relative position of the end mill 10 with respect to the workpiece M1, is adjusted as in the case of the end milling apparatus 100. However, there are other methods for adjusting the relative position of the end mill 10 with respect to the workpiece M1 using actuators. The present embodiment merely shows one example of the adjusting methods, and the present technique is not limited to the adjusting method of the present embodiment.

7-8. Combination of Modifications

Of course, the above-described modifications may be combined freely.

8. Summary of the Present Embodiment

As having been described in detail, the end milling apparatus 100 of the present embodiment has the support member 20 which is located behind the end mill 10 with respect to the feed direction K1 of the end mill 10. The support member 20 supports the non-cutting portion 12 of the end mill 10. This support suppresses vibration of the end mill 10 in the advancement direction or the feed direction K1. Thus, of the vibration modes in two directions, a vibration mode in one direction (the Y-axis direction) is suppressed. Therefore, mode-coupling-type self-excited vibration is suppressed as a whole.

(Second Embodiment)

A second embodiment will be described. The present embodiment is characterized in that the support member has a lubrication oil supply opening. Therefore, this difference will be mainly described.

1. End Milling Apparatus

Figure 9:
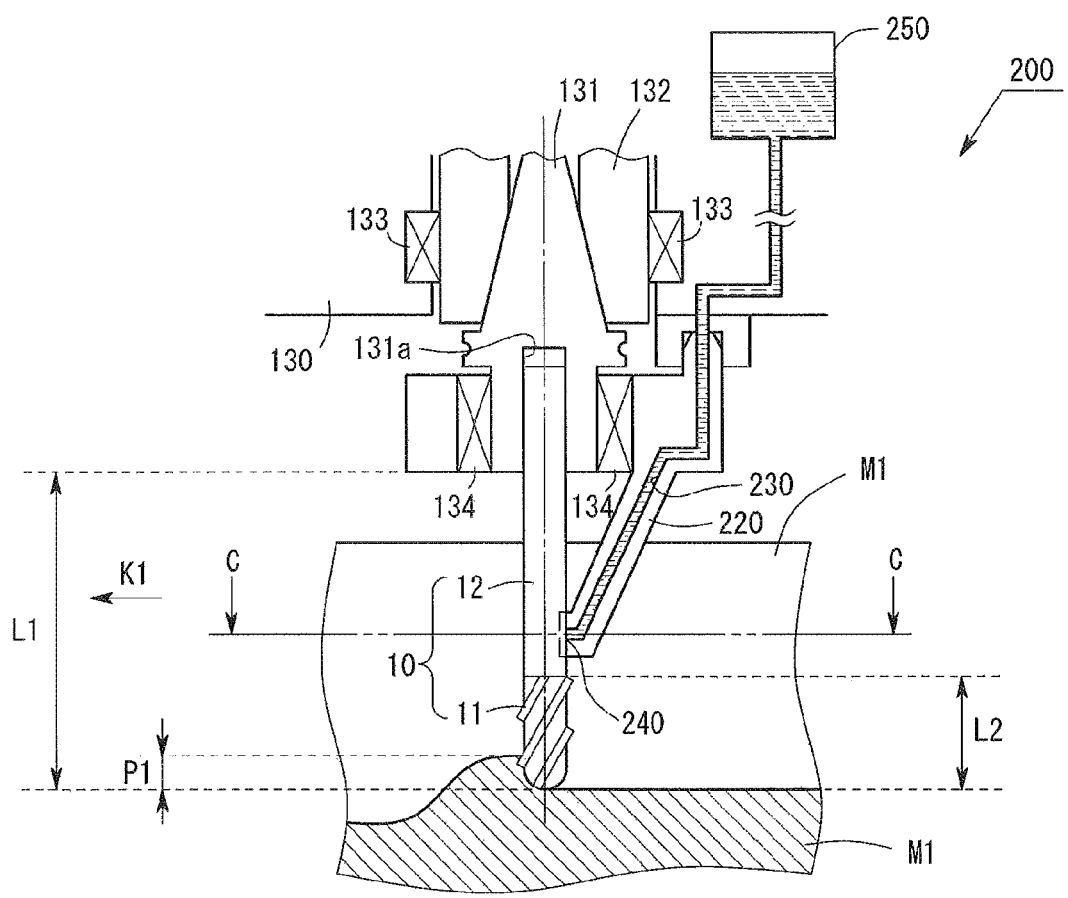
FIG. 9 is a sectional view showing the structure of a portion of an end milling apparatus according to a second embodiment, which portion is in the vicinity of an end mill.

FIG. 9 shows an end milling apparatus 200 of the present embodiment. The end milling apparatus 200 of the present embodiment includes a support member 220 having a lubrication oil supply opening 240 in place of the support member 20 of the first embodiment. The support member 220 has a flow passage 230 and the lubrication oil supply opening 240. The flow passage 230 is provided in the support member 220. Lubrication oil flows through the flow passage 230.

Also, the end milling apparatus 200 of the present embodiment includes a lubrication oil supply section 250 in addition to the structure of the end milling apparatus 100 of the first embodiment. The lubrication oil supply section 250 communicates with the flow passage 230 of the support member 220 and the lubrication oil supply opening 240. Therefore, the lubrication oil stored in the lubrication oil supply section 250 passes through the flow passage 230 and is fed out from the lubrication oil supply opening 240.

2. Lubrication Oil Supply Opening

Figure 10:
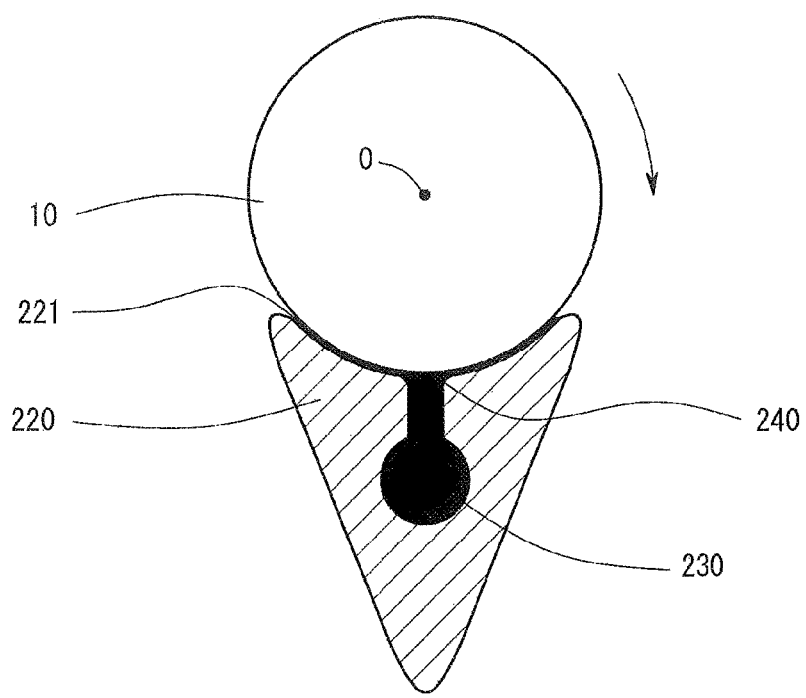
FIG. 10 is a sectional view showing a cross section taken along line C-C of FIG. 9.

FIG. 10 is a sectional view showing a section taken along line C-C of FIG. 9. An arrow in FIG. 10 represents the rotation direction of the end mill 10. As shown in FIG. 10, the flow passage 230 through which the lubrication oil passes is formed in the support member 220. The lubrication oil supply opening 240 is provided on a surface 221 of the support member 220 which faces the end mill 10.

As shown in FIG. 10, the lubrication oil fed out from lubrication oil supply opening 240 spreads over the substantially entirety of the surface 221 of the support member 220 which faces the end mill 10. After being supplied to the non-cutting portion 12 of the end mill 10, the lubrication oil flows along the periphery of the end mill 10 and is supplied to the cutting portion 11 of the end mill 10.

As shown in FIG. 10, since the lubrication oil is present between the end mill 10 and the support member 220, when the end mill 10 is rotating, the support member 220 and the end mill 10 hardly come into contact with each other. The end mill 10 is supported by the dynamic pressure (wedge) effect of the lubrication oil between the end mill 10 and the surface 221. Namely, the support member 220 supports the non-cutting portion 12 of the end mill 10 via the lubrication oil without coming into contact with the end mill 10. Of course, in this case as well, the vibration of the end mill 10 in the Y-axis direction can be suppressed as in the case of the first embodiment. Therefore, mode-coupling-type self-excited vibration can be suppressed.

The dynamic pressure effect is attained when the oil film has a thickness equal to or greater than a value corresponding to the surface roughness of the non-cutting portion 12 of the end mill 10. For example, the thickness of the oil film is several micrometers or greater. Also, the oil film does not disappear immediately after about one revolution of the end mill 10. Therefore, the non-contact support can be performed even at a position on the upstream side of the lubrication oil supply opening 240 with respect to the rotational direction.

Figure 11:
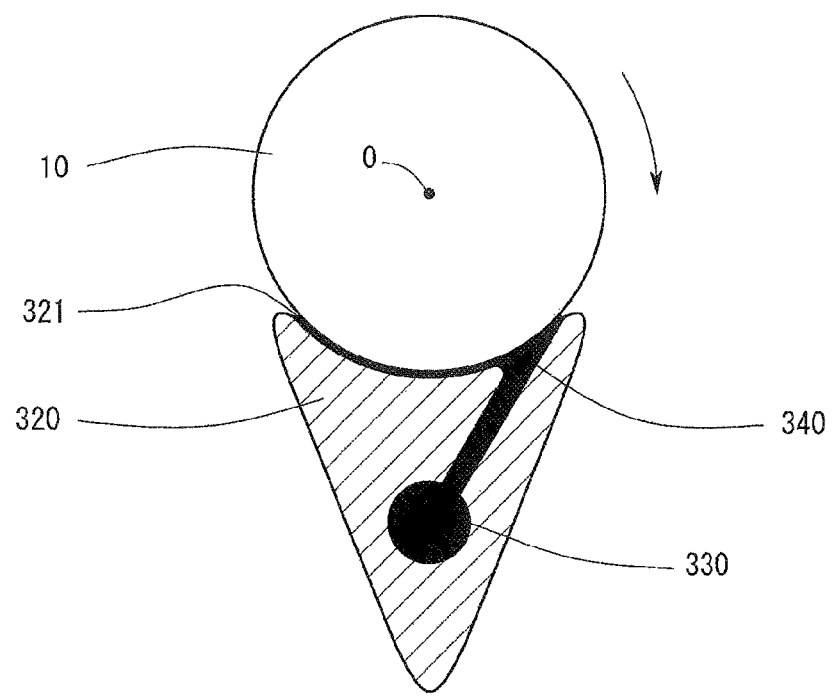
FIG. 11 is a sectional view showing a support member according to a first modification of the second embodiment.

3. Modifications 3-1. Lubrication Oil Supply Opening Located on the Rotational-direction Upstream Side A support member 320 as shown in FIG. 11 may be used as a support member which supports the end mill 10. The support member 320 has a lubrication oil supply opening 340 on a surface 321 which faces the end mill 10. The lubrication oil supply opening 340 is disposed on the surface 321 of the support member 320 at a position on the upstream side in the rotational direction of the end mill 10. Therefore, the lubrication oil fed out from the lubrication oil supply opening 340 moves over a certain distance together with rotation of the end mill 10 and spreads over the surface 321.

3-2. Two Lubrication Oil Supply Openings

Figure 12:
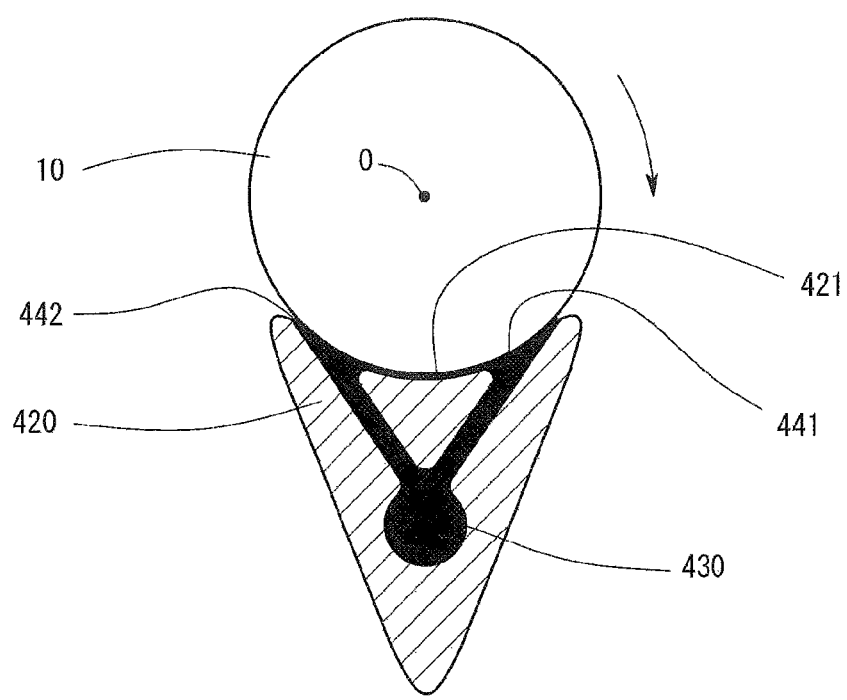
FIG. 12 is a sectional view showing a support member according to a second modification of the second embodiment.

As shown in FIG. 12, a support member 420 which feeds out the lubrication oil at two locations may be provided. In such a case, the support member 420 has two lubrication oil supply openings 441 and 442 on a surface 421 which faces the end mill 10. The lubrication oil supply opening 441 is provided on the surface 421 which faces the end mill 10 such that the lubrication oil supply opening 441 is located on the upstream side in the rotational direction of the end mill 10. The lubrication oil supply opening 442 is provided on the surface 421 which faces the end mill 10 such that the lubrication oil supply opening 442 is located on the downstream side in the rotational direction of the end mill 10. Namely, the lubrication oil supply opening 442 is located downstream of the lubrication oil supply opening 441 in the rotational direction of the end mill 10.

3-3. Lubrication Oil

The lubrication oil supplied from the lubrication oil supply section 250 may also serve as a cutting fluid supplied to the cutting portion.

3-4. Cutting Fluid

In the present embodiment, the lubrication oil is supplied from the support member 220 to the end mill 10. However, cutting fluid may be supplied from the side where the root of the end mill 10 is located. In such a case, the cutting fluid flowing down to the cutting portion 11 of the end mill 10 is supplied to the space between the support member and the non-cutting portion 12 of the end mill 10. Thus, the end mill 10 is supported by the dynamic pressure of the cutting fluid. In this case, needless to say, the end milling apparatus has a cutting fluid supply section for supplying the cutting fluid to the end mill 10.

3-5. Other Modifications

Also, the modifications described in the first embodiment may be used. In particular, it is preferred to use a variable lead or variable pitch end mill.

4. Summary of the Present Embodiment

As having been described in detail, the end milling apparatus 200 of the present embodiment has the support member 220 which is located behind the end mill 10 with respect to the feed direction K1 of the end mill 10. The support member 220 supports the non-cutting portion 12 of the end mill 10 via lubrication oil. This support suppresses the vibration of the end mill 10 in the advancement direction or the feed direction K1. Thus, of the vibration modes in two directions, a vibration mode in one direction (the Y-axis direction) is suppressed. Therefore, mode-coupling-type self-excited vibration is suppressed as a whole.

(Third Embodiment)

A third embodiment will be described. The mechanical structure of an end milling apparatus of the present embodiment is the same as those of the first embodiment and the second embodiment. The present embodiment differs from the first and second embodiments in the machining method. Therefore, only the difference will be described below.

1. Machining Method (Down Cut)

Figure 13:
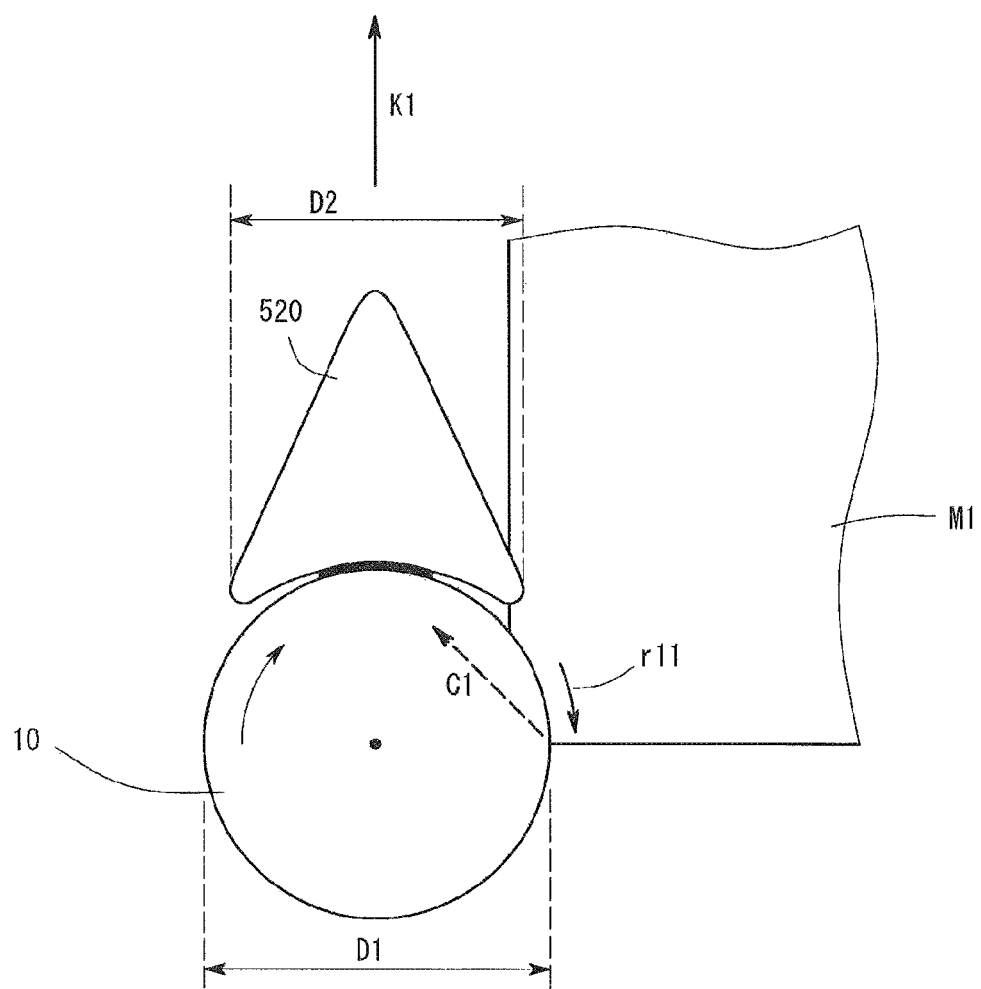
FIG. 13 is a sectional view showing a support member of an end milling apparatus according to a third embodiment.

The machining method of the present embodiment is used so as to perform down cut as shown in FIG. 13. Down cut refers to machining in which the direction of movement of the tooth (cutting edge) when cutting the workpiece M1 becomes opposite the feed direction K1 of the end mill 10. As shown in FIG. 13, when down cut is performed, the end mill 10 receives a force in the direction of an arrow C1. The arrow C1 conceptually shows the force. In actuality, the direction and size of the arrow C1 change depending on, for example, the shape and the degree of wear of the cutting edges of the end mill 10, the rotational position of the end mill 10, the degree of friction between the end mill 10 and the workpiece, etc. However, the direction of the force is close to the feed direction K1.

Therefore, when such down cut is performed, as shown in FIG. 13, a support member 520 is disposed in front of the end mill 10 with respect to the feed direction K1 of the end mill 10. This arrangement allows the support member 520 to receive the force in the direction of the arrow C1 to thereby suppress mode-coupling-type self-excited vibration.

2. Modifications 2-1. Support Members Located in Two Directions

Figure 14:
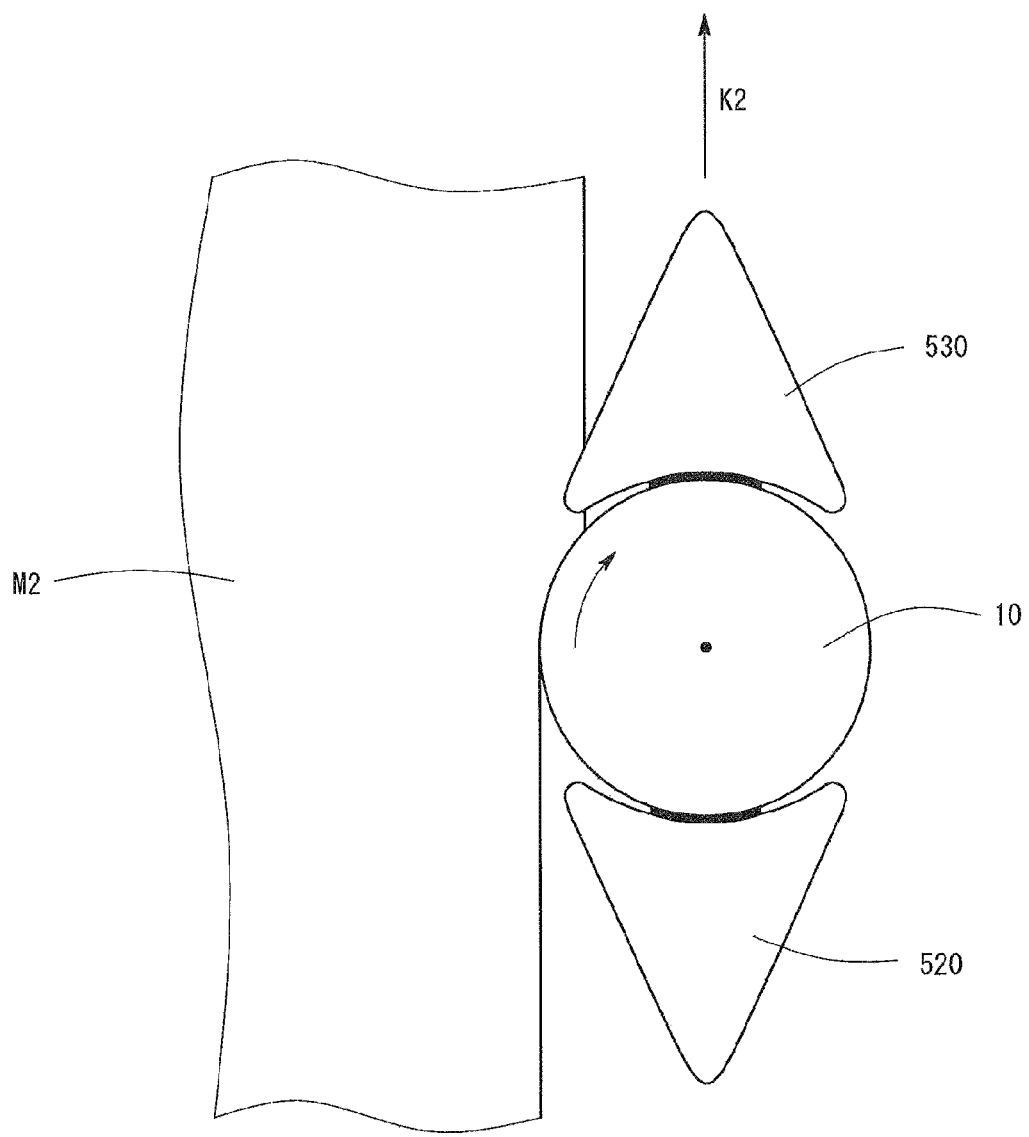
FIG. 14 is a sectional view showing a support member according to a modification of the third embodiment.

As shown in FIG. 14, a support member 520 may be disposed behind the end mill 10 with respect to the feed direction K2 of the end mill 10, and a support member 530 may be disposed in front of the end mill 10 with respect to the feed direction K2 of the end mill 10. In such a case, the support members 520 and 530 can suppress mode-coupling-type self-excited vibration. Such an arrangement can shorten the machining time. Specifically, for example, in the case where the depth or width of a groove to be formed is increased by repeating machining in opposite (advancing and retracting) feed directions, the support member must be rotated by 180 degrees with respect to the workpiece M1 when the feed direction is reversed. However, the above-described arrangement eliminates the necessity of rotating the support member to thereby shorten the machining time.

Also, the support members 520 and 530 support the non-cutting portion 12 of the end mill 10 from different directions. Also, the end milling apparatus may have three or more support members.

2-2. Cutting Processes Other than Down Cut

The present embodiment has been described by taking down cut as an example. However, even in the case of a cutting process other than down cut, machining may be performed with the support member 520 disposed in front of the end mill 10 with respect to the feed direction K1 of the end mill 10.

2-3. Other Modifications

The machining method of the present embodiment may, of course, be used for the end milling apparatuses described in the first embodiment and the second embodiment and the modifications thereof.

(Fourth Embodiment)

A fourth embodiment will be described. The mechanical structure of an end milling apparatus of the present embodiment is the same as those of the first embodiment and the second embodiment. The present embodiment differs from the first and second embodiments in the machining method. Therefore, only the difference will be described below.

1. Machining Method (Up Cut)

In the machining method of the present embodiment, the workpiece M1 is machined by up cut. Up cut refers to machining in which the direction of movement of the tooth (cutting edge) when cutting the workpiece M1 becomes the same as the feed direction K1 of the end mill 10. Namely, in the case of up cut, the cutting edges of the end mill 10 are rotated in the direction opposite the rotational direction in the case of down cut. Alternatively, the feed direction K1 is made opposite the feed direction in the case of down cut.

As will be described later, when the workpiece M1 is machined by up cut, regenerative-type self-excited vibration is suppressed. The end milling apparatuses of the first embodiment and the second embodiment have support members (20, etc.). Therefore, these end milling apparatuses suppress mode-coupling-type self-excited vibration. When the workpiece M1 is machined by up cut, not only mode-coupling-type self-excited vibration but also regenerative-type self-excited vibration is suppressed. Therefore, self-excited vibrations which are amplified during machining can be suppressed effectively. Accordingly, each of the end milling apparatuses of the first embodiment and the second embodiment has a very high stability against the self-excited vibrations.

Figure 15:
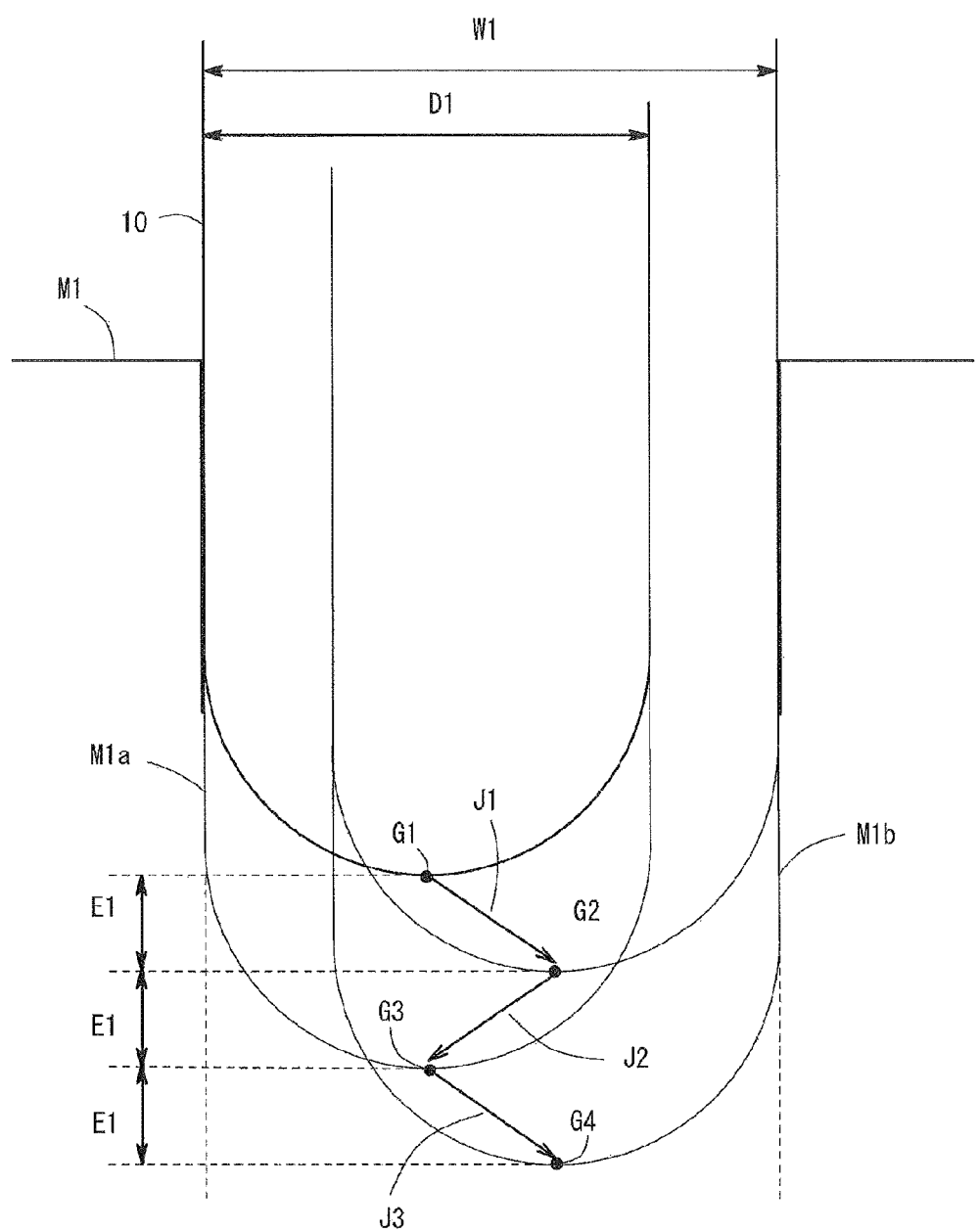
FIG. 15 is a conceptual view showing a machining method of an end milling apparatus according to a fourth embodiment.

FIG. 15 is a conceptual view for describing the machining method of the present embodiment. In the present embodiment, when a narrow groove is to be formed, the workpiece M1 is always machined by up cut. FIG. 15 shows the position G1 of the distal end of the end mill 10 in an n-th machining cycle, the position G2 of the distal end of the end mill 10 in an (n+1)-th machining cycle, the position G3 of the distal end of the end mill 10 in an (n+2)-th machining cycle, and the position G4 of the distal end of the end mill 10 in an (n+3)-th machining cycle.

The distal end of the end mill 10 performs feed motion in the direction orthogonal to the surface of the sheet of FIG. 15 and moves successively to different positions as indicated by arrows J1, J2, and J3. Namely, the distal end of the end mill 10 moves toward the deeper side of the narrow groove while depicting a spiral, to thereby machine the workpiece M1.

As shown in FIG. 15, a first surface M1*a* is machined by the machining in the n-th machining cycle, a second surface M1*b* is machined by the machining in the (n+1)-th machining cycle, the first surface M1a is again machined by the machining in the (n+2)-th machining cycle, and the second surface M1b is again machined by the machining in the (n+3)-th machining cycle. When the machining in the (n+1)-th machining cycle is performed after the n-th machining cycle, the end mill 10 is moved toward the deeper side of the narrow groove by an infeed amount (depth of cut) E1. Notably, the first surface M1a and the second surface M1b are inner side surfaces of the narrow groove which face each other. The width W1 of the narrow groove is equal to the distance between the first surface M1a and the second surface M1b.

2. Modification 2-1. Spiral Machining

Here, the expression "n-th machining cycle" is used for reasons of convenience. However, in the case where the end mill 10 is moved spirally by continuously increasing the depth of cut during the feed motion for machining, a desired narrow groove can be formed by a single machining operation. This machining method allows the end mill 10 to always machine the workpiece M1 by up cut.

2-2. Other Types of Machining

Also, the modifications described in the first embodiment through the third embodiment can be used properly.

(Fifth Embodiment)

A fifth embodiment will be described. In the present embodiment, there will be described a machining system which includes one of the end milling apparatuses described in the first embodiment through the fourth embodiment.

1. Configuration of the System

Figure 16:
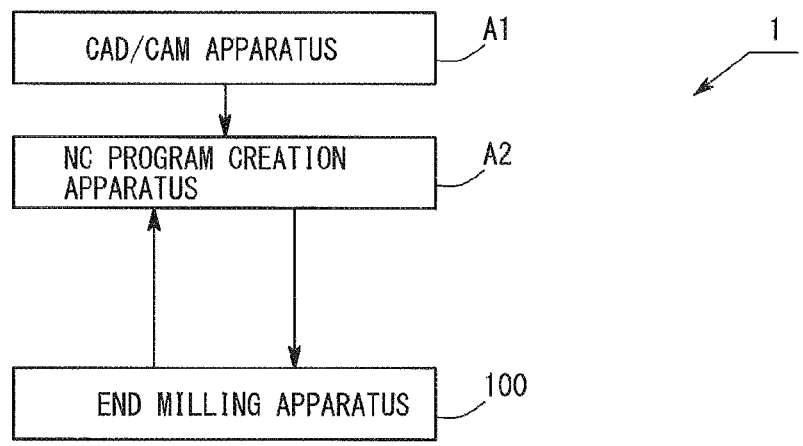
FIG. 16 is a conceptual view showing a machining system according to a fifth embodiment.

FIG. 16 shows the overall configuration of the present embodiment. As shown in FIG. 16, the machining system 1 includes a CAD/CAM apparatus A1, an NC program creation apparatus A2, and an end milling apparatus 100.

The CAD/CAM apparatus A1 has a CAD function section for performing parts design, mold design, etc.; and a CAM function section which performs process design on the basis of the 3D data produced as a result of parts design, mold design, etc. and determines tool paths and NC data such as cutting depth. The NC program creation apparatus A2 creates an NC program from the NC data determined by the CAD/CAM apparatus A1.

2. CAD/CAM Apparatus

Since conventional end mills are rotary tools, when interference with the workpiece M1 is considered, it is only necessary to use, as a sweeping shape, the shape of each end mill which is rotational symmetrical with respect to the spindle. In contrast, in the end milling apparatuses described in the first embodiment through the fourth embodiment, although the end mill 10 itself can be handled as a member which is rotational symmetrical with respect to the spindle, the support member (20, etc.) cannot be handled as a member which is rotational symmetrical with respect to the spindle. Therefore, when the path of a tool is determined, not only the rotational symmetrical shape of the end mill 10 but also the shape of the support member (20, etc.) must be determined such that none of the tool and the support member interferes with the workpiece M1.

Namely, in CAD/CAM apparatus A1, when a tool path is calculated, the position and attitude of the combination of the end mill 10 and the support member (20, etc.) with respect to the workpiece M1 (positions in the X axis, the Y axis, and the Z axis and rotational positions about these axes) are determined such that the combination of the rotational symmetrical shape of the end mill 10 and the shape of the support member does not interfere with the workpiece M1 not only in periods in which machining is performed but also in periods in which machining is not performed. However, needless to say, the cutting portion 11 of the end mill 10 is allowed to interfere with a to-be-machined portion of the workpiece M1 in the periods in which machining is performed.

Therefore, the CAD/CAM apparatus A1 performs design support by using the shape of the end mill 10 and the shape of the support member 20. The term "design support" used herein refers to support of process design and work design.

3. NC Program

In the end milling apparatus 100, the support member 20 is disposed on the Y-axis direction positive side or the Y-axis direction negative side of the end mill 10. Alternatively, two support members may be disposed on the Y-axis direction positive side and the Y-axis direction negative side, respectively, of the end mill 10. Namely, the end milling apparatus 100 is operated on the basis of the shape information and the positional information of the support member 20 and the shape information and the positional information of the workpiece M1. Alternatively, the NC program may contain an auxiliary operation command which instructs an auxiliary operation for preventing the support member 20 from interfering with the workpiece M1. As a result, mode-coupling-type self-excited vibration which has been described in the embodiments and the modifications can be suppressed.

4. Modifications 4-1. C-axis Motor

In the case where the machine tool has a C axis, the rotational position of the workpiece M1 relative to the support member 20 is determined by the C-axis motor 115. Also, the position of the support member 20 relative to the workpiece M1 may be determined.

4-2. Position of the Support Member

In the present embodiment, as described above, the support member 20 is disposed on the Y-axis direction positive side or the Y-axis direction negative side of the end mill 10. However, in the case where there is another position at which the support member 20 does not interfere with the workpiece, the support member 20 may be disposed at that position.

4-3. Machining Shape

All the end milling apparatuses described hereinbefore can, of course, perform not only machining of a groove but also machining of other three-dimensional shapes. However, the position of the support member must be determined in accordance with the machining shape, tool path, etc. such that the support member does not interfere with the workpiece.

EXAMPLE

1. Experimental Conditions and Analytical Conditions 1-1. End Milling Apparatuses Used for Experiment and Analysis An end milling apparatus having a support member 620 shown in FIG. 17 and an end milling apparatus not having the support member 620 were used. The shape of a portion of the support member 620 which comes into contact with the end mill 10 is approximately the same as the support member 20. A constant pitch ball end mill and a variable pitch ball end mill were used as end mills. Machining and analysis were performed for four cases; i.e., the case where the support member 620 was provided and the constant pitch ball end mill was used, the case where the support member 620 was provided and the variable pitch ball end mill was used, the case where the support member 620 was not provided and the constant pitch ball end mill was used, and the case where the support member 620 was not provided and the variable pitch ball end mill was used.

The overhang length (L1) of the end mill (10) was 60 mm. The diameter (D1) of the end mill (10) was 6 mm. The number of cutting edges was 2. The pitch angles of the variable pitch end mill were 173.9787° and 186.0213°. Of course, the pitch angle of the constant pitch end mill was 180°.

1-2. Axial Directions

Figure 17:
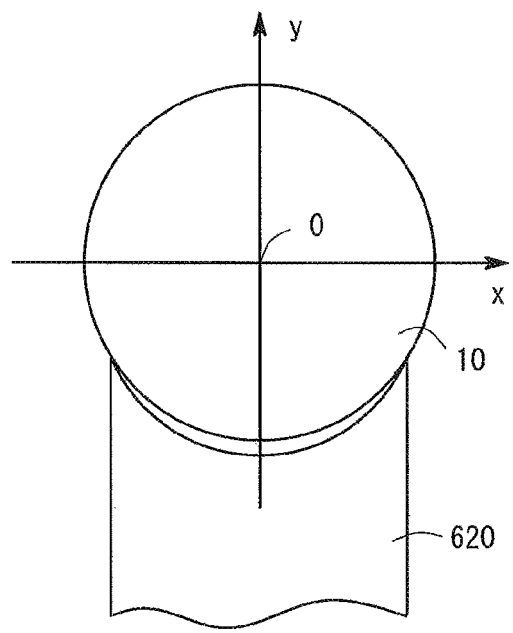
FIG. 17 is an illustration showing the relation between an end mill and the directions of an X axis and a Y axis in an experiment.

Here, the X axis and the Y axis set in the present experiment will be described. As shown in FIG. 17, the feed direction of the end mill is defined as the Y-axis direction. The axial direction of the end mill is defined as the Z-axis direction. The direction orthogonal to the Y-axis direction and the Z-axis direction is defined as the X-axis direction.

1-3. Workpiece, Etc.

The workpiece was formed of SKD61 (HRC46). The cutting atmosphere was water soluble cutting fluid.

2. Experimental Results 2-1. Compliance Transfer Function (Constant Pitch Ball End Mill)

Figure 18A:
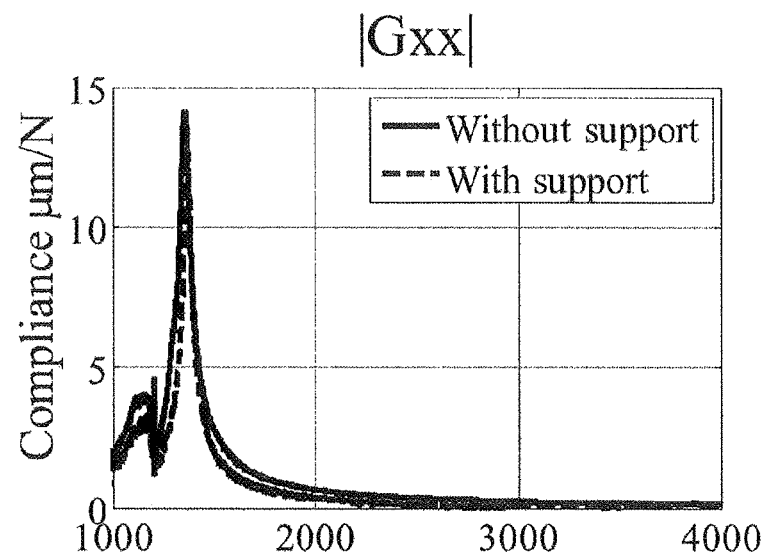
FIG. 18 is a pair of graphs each showing the relation between vibration frequency of an end mill and compliance in an experiment.
Figure 18B:
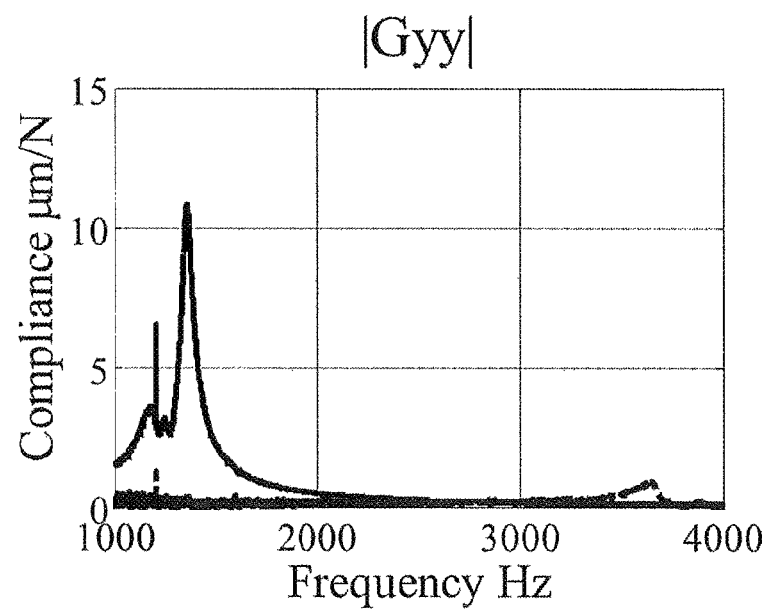

FIG. 18 is a pair of graphs each showing the relation between frequency and compliance at the distal end of the constant pitch end mill. The horizontal axis of FIG. 18 represents frequency (Hz). The vertical axis of FIG. 18 represents the compliance (μm/N) of the distal end of the end mill. The smaller the compliance, the higher the stability of the end mill against vibrations.

FIG. 18(*a*) shows compliance transfer functions |Gxx| each representing the characteristic of vibration in the X-axis direction when a vibration was applied in the X-axis direction. As shown in FIG. 18(*a*), each of the compliance transfer function |Gxx| for the case the support member 620 was provided and the compliance transfer function |Gxx| for the case the support member 620 was not provided has a large peak in the vicinity of 1350 Hz. If such a peak is present, the vibration may sharply increase in the middle of end milling. Namely, the stability against chatter vibration may lower. Also, in the case where the support member 620 was used, the regenerative-type self-excited vibration in the X-axis direction is slightly smaller as compared with the case where the support member 620 was not used.

FIG. 18(*b*) shows compliance transfer functions |Gyy| each representing the characteristic of vibration in the Y-axis direction when a vibration was applied in the Y-axis direction. As shown in FIG. 18(*b*), the compliance transfer function |Gyy| for the case the support member 620 was not provided has a large peak in the vicinity of 1350 Hz. However, in the compliance transfer function |Gyy| for the case the support member 620 was provided, such a peak disappears almost completely. Namely, the support member 620 suppresses the vibration of the end mill 10 in the Y-axis direction.

As described above, the support member 620 can suppresses mode-coupling-type self-excited vibration by suppressing the vibration in the Y-axis direction; namely, the vibration in the feed direction. Also, the support member 620 suppresses, only slightly, the regenerative-type self-excited vibration in the X-axis direction.

Figure 19A:
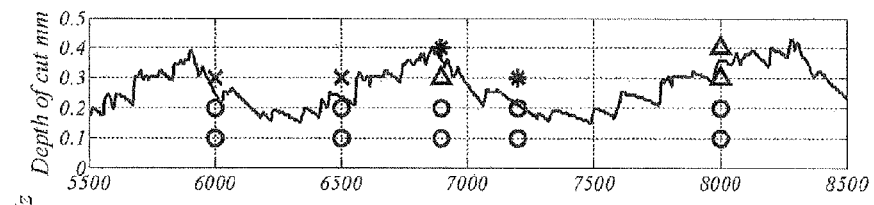
FIG. 19 is a pair of graphs showing the results of an experiment on the stability limit of a constant pitch end mill.
Figure 19B:
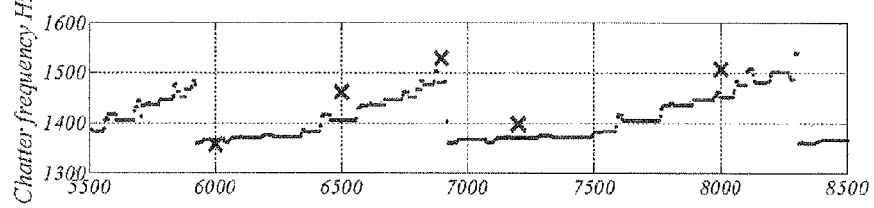

2-2. Stability Limit Test 2-2-1. Constant Pitch Ball End Mill with Support Member FIG. 19 is a pair of graphs showing the results of a test in which the stability limit of chatter vibration was investigated for the case where a constant pitch ball end mill was used and the support member 620 was applied. The horizontal axis of FIG. 19(*a*) represents the rotational speed (rpm) of the end mill. The vertical axis of FIG. 19(*a*) represents the depth of cut; i.e., the axial infeed amount (mm). The axial infeed amount refers to the infeed amount of the end mill in the direction of the rotational axis thereof. In the case where the coordinate axes are defined as shown in FIG. 1, the axial infeed amount is the infeed amount in the Z-axis direction. The line shown in FIG. 19(*a*) shows a stability limit estimated by an analytical model. For example, it is assumed that the stability limit value at a certain rotational speed is 0.2 mm. In such a case, when the end mill is rotated at that rotational speed, the end milling apparatus can perform stable machining if the axial infeed amount is 0.2 mm or less. Namely, the larger the stability limit value, the greater the degree to which the infeed amount can be increased for more efficient machining.

As shown in FIG. 19(*a*), the line of the theoretical stability limit has a plurality of peaks at particular rotational speeds. Notably, this line of the stability limit is depicted on the basis of the measurement data of FIG. 18. Therefore, this line is not so smooth. The marks "O," "Δ," "x," and "*" in FIG. 19(*a*) show the presence/absence and magnitude of self-excited vibrations of the ball end mill when cutting operation was performed at different rotational speeds and with different axial infeed amounts.

The mark "O" shows the case where the maximum component whose frequency is not n (n is an integer) times the rotational frequency (i.e., forced vibration) was equal to or less than 1 μm. The mark "Δ" shows the case where the maximum component whose frequency is not n (n is an integer) times the rotational frequency was greater than 1 μm and was not greater than 2 μm. The mark "X" shows the case where the maximum component whose frequency is not n (n is an integer) times the rotational frequency was greater than 2 μm and was not greater than 4 μm. The mark "*" shows the case where the maximum component whose frequency is not n (n is an integer) times the rotational frequency was greater than 4 μm.

As shown in FIG. 19(*a*), in the case where the slender constant pitch ball end mill and the support member 620 are used for machining, the upper limit of the axial infeed amount which allows stable machining is about 0.2 mm to about 0.4 mm.

The horizontal axis of FIG. 19(*b*) represents the rotational speed (rpm) of the end mill. The vertical axis of FIG. 19(*b*) represents the frequency (Hz) of chatter vibration. As shown in FIG. 19(*b*), the frequency of chatter vibration is always higher than the resonance frequency of about 1350 Hz shown in FIG. 18. This means that as a result of use of the support member 620, coupling-mode-type self-excited vibration is suppressed, and regenerative-type self-excited vibration still remains.

2-2-2. Variable Pitch Ball End Mill

Figure 20A:
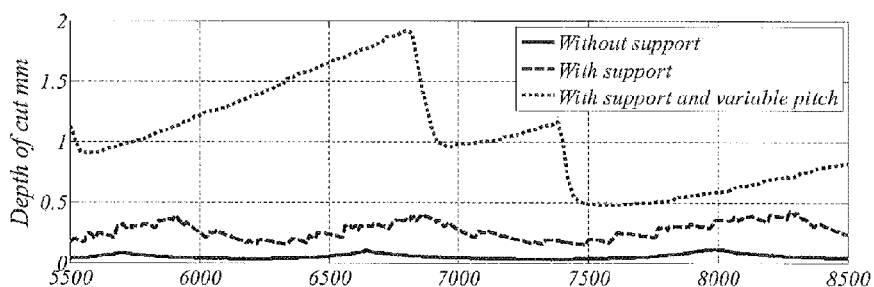
FIG. 20 is a pair of graphs showing the results of an experiment on the stability limit of a variable pitch end mill.

FIG. 20 is a pair of graphs showing the results of a test in which the stability limit was investigated for the case where a variable pitch ball end mill was used. The horizontal axis of FIG. 20(*a*) represents the rotational speed (rpm) of the end mill. The vertical axis of FIG. 20(*a*) represents the axial infeed amount. FIG. 20(*a*) also shows the results of the test shown in FIG. 19(*a*) for the case where a variable pitch ball end mill was used and the support member 620 was applied. As shown in FIG. 20(*a*), in the case where a constant pitch ball end mill is used and the support member 620 is not applied, the upper limit of the axial infeed amount which allows stable machining is about 0.03 mm to about 0.1 mm. In contrast, in the case where a variable pitch ball end mill is used and the support member 620 is applied, the upper limit of the axial infeed amount which allows stable machining is about 0.5 mm to about 2 mm. Also, the upper limit of the axial infeed amount which allows stable machining has a peak in the vicinity of 6800 rpm (the rotational speed of the end mill).

As described above, as a result of use of the support member 620 and a variable pitch end mill, the limit value of the axial infeed amount which allows stable machining while suppressing chatter vibration; i.e., the limit of machining efficiency, increases considerably. Notably, an increase in the limit value of the axial infeed amount for the case where the support member 620 and a variable pitch end mill were used does not result from simple combination of the effect of use of a variable pitch end mill and the effect of use of the support member 620. Namely, use of a variable pitch end mill and use of the support member 620 provide a synergetic effect.

Figure 20B:
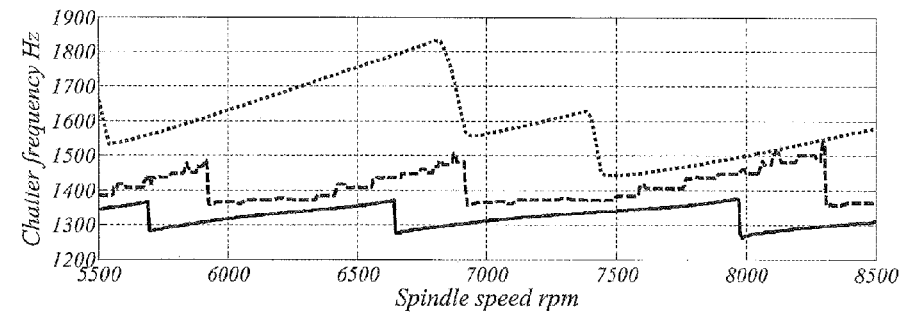

The horizontal axis of FIG. 20(b) represents the rotational speed (rpm) of the end mill. The vertical axis of FIG. 20(b) represents the frequency (Hz) of chatter vibration. The frequency of chatter vibration has a peak in the vicinity of 6800 rpm (the rotational speed of the end mill). This peak is located at the same position (at the same rotational speed of the end mill) as that in the case of FIG. 20(a).

2-3. Up Cut

FIG. 21 is a pair of graphs for comparing the stability of cutting between up cut and down cut. The horizontal axis of FIG. 21 represents the width W1 (see FIG. 15) of a groove to be formed. The vertical axis of FIG. 21 represents the difference between the depth of cut in the (n+1)-th cutting cycle and the depth of cut in the n-th cutting cycle; i.e., the infeed amount E1 (see FIG. 15). In the present experiment, since an end mill whose diameter D1 is 6 mm is used, a groove whose width is smaller than 6 mm cannot be machined. Therefore, in FIG. 21, the groove width W1 is 6 mm or greater.

Figure 21A:
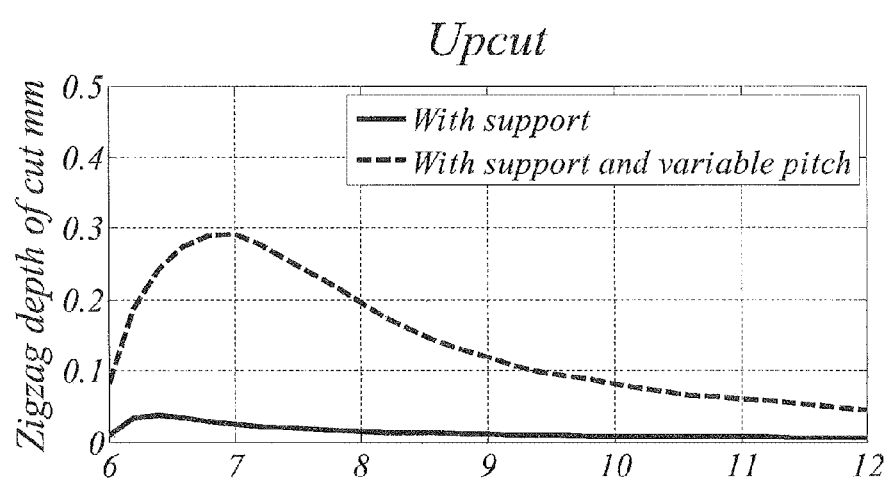
FIG. 21 is a pair of graphs for comparing the stability of cutting between up cut and down cut.

FIG. 21(a) is a graph showing the case of up cut. A continuous line of FIG. 21(a) shows the result of a test performed by using the support member 620 and a constant pitch end mill. A broken line of FIG. 21(a) shows the result of a test performed by using the support member 620 and a variable pitch end mill. When an infeed amount E1 located below the continuous line and the broken line is set, stable machining is possible.

As shown in FIG. 21(a), in the case where a workpiece is machined by up cut and the support member 620 and a variable pitch end mill are used, a peak appears in the vicinity of 7 mm (the groove width W1). In the vicinity of that peak, the infeed amount E1 may be set to about 0.3 mm. In such a case, the workpiece can be machined stably.

Meanwhile, in the case where the support member 620 and a constant pitch end mill are used, the problem of self-excited vibrations may occur when the infeed amount E1 is about 0.02 mm.

Figure 21B:
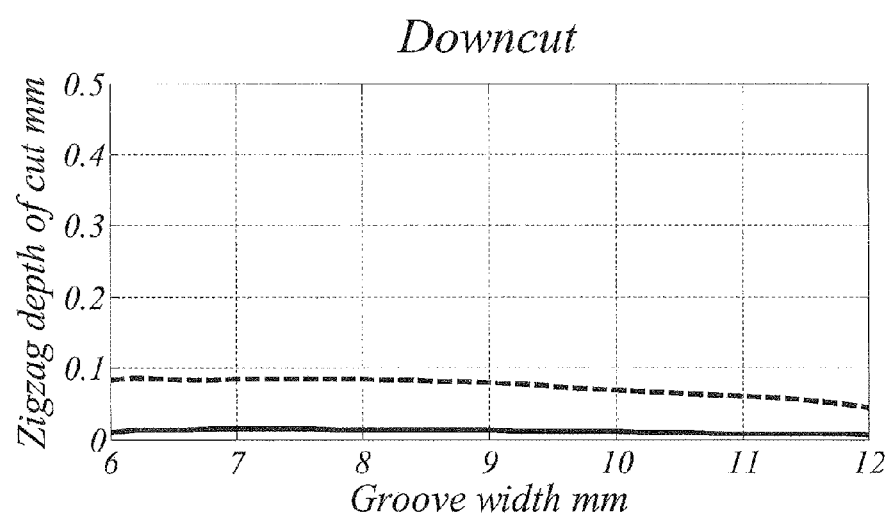

As shown in FIG. 21(b), in the case where the workpiece is machined by down cut, the infeed amount E1 which allows stable machining through use the support member 620 and a variable pitch end mill is about 0.08 mm. Also, the infeed amount E1 which allows stable machining through use the support member 620 and a constant pitch end mill is about 0.02 mm. In the case where down cut is performed, no peak appears unlike the case where up cut is performed.

As described above, use of the support member 620 and a variable pitch end mill suppresses mode-coupling-type self-excited vibration and regenerative-type self-excited vibration. Therefore, machining of a narrow groove can be performed efficiently with a large infeed amount through use of an end mill whose overhang length L1 is larger than the diameter D1 of the end mill. Further, when a feed direction for up cut is selected and the tool diameter and the groove width are properly set, machining of the narrow groove can be performed efficiently with a larger infeed amount as compared with the case of down cut. In the case of up cut, the direction of the cutting force is closer to the feed direction as compared with the case of down cut. This reduces the cutting force component; i.e., an excitation force, in the X-axis direction in which the effect of the support member cannot be obtained sufficiently. Therefore, in the case of up cut, self-excited vibrations are suppressed more as compared with the case of down cut.

DESCRIPTION OF REFERENCE NUMERALS 100, 200 . . . end milling apparatus
10 . . . end mill
11 . . . cutting portion
12 . . . non-cutting portion
20, 120, 220, 320, 420, 520, 620 . . . support member
240, 340, 441, 442 . . . lubrication oil supply opening

The invention claimed is:

1. An end milling apparatus comprising:
   an end mill comprising a cutting portion and a non-cutting portion; and
   at least one support member which supports the non-cutting portion of the end mill in at least one direction toward a periphery of the end mill,
   wherein a width of the support member as measured in a direction orthogonal to a direction of a center axis of the end mill and to a direction in which the support member is located as viewed from the end mill is smaller than an outer diameter of the end mill.

2. The end milling apparatus according to claim 1, further comprising a cutting fluid supply portion which supplies cutting fluid to the end mill, wherein the support member supports the non-cutting portion of the end mill via the cutting fluid.

3. The end milling apparatus according to claim 1, further comprising a lubrication oil supply portion which supplies lubrication oil to the end mill, wherein the support member comprises a flow passage through which the lubrication oil supplied from the lubrication oil supply section flows, and a lubrication oil supply opening for supplying the lubrication oil to the non-cutting portion of the end mill.

4. The end milling apparatus according to claim 3, wherein the support member supports the non-cutting portion of the end mill via the lubrication oil.

5. The end milling apparatus according to claim 1, wherein the support member supports the end mill in a state in which the support member is in contact with the non-cutting portion.

6. The end milling apparatus according to claim 1, comprising two or more support members, and the support members support the non-cutting portion of the end mill in different directions.

7. The end milling apparatus according to claim 1, wherein the support member comprises at least one support surface which faces the non-cutting portion of the end mill, and the support surface is at least a portion of a cylindrical inner surface.

8. The end milling apparatus according to claim 2, wherein the support member comprises at least one support surface which faces the non-cutting portion of the end mill, and the support surface is at least a portion of a cylindrical inner surface.

9. The end milling apparatus according to claim 3, wherein the support member comprises at least one support surface which faces the non-cutting portion of the end mill, and the support surface is at least a portion of a cylindrical inner surface.

10. The end milling apparatus according to claim 7, wherein the support member comprises two or more support surfaces.

11. The end milling apparatus according to claim 8, wherein the support member comprises two or more support surfaces.

12. The end milling apparatus according to claim 9, wherein the support member comprises two or more support surfaces.

13. The end milling apparatus according to claim 1, wherein the support member is disposed at least one of a location in front of the end mill and a location behind the end mill with respect to a feed direction in which the end mill is advanced relative to a workpiece.

14. The end milling apparatus according to claim 1, wherein the cutting portion of the end mill is formed to have a variable lead or a variable pitch.

15. The end milling apparatus according to claim 1, further comprising a bearing which supports the stationary support member on a holder which grasps the end mill and couples the end mill with a rotary spindle.

16. A CAM apparatus for supporting the end milling apparatus according to claim 1, the CAM apparatus supports process design or work design through use of a shape of the end mill and a shape of the support member.

17. An NC program for operating the end milling apparatus according to claim 1, the NC program operates the end milling apparatus on the basis of shape information and positional information of the support member and shape information and positional information of a workpiece.

18. An NC program for operating the end milling apparatus according to claim 1, the NC program contains an auxiliary operation command which instructs an auxiliary operation for preventing the support member from interfering with a workpiece.

19. An NC program for operating the end milling apparatus according to claim 1, the NC program operates the end milling apparatus so as to machine a workpiece by up cut.

* * * * *